(12) United States Patent
Schwartz

(10) Patent No.: US 10,764,451 B2
(45) Date of Patent: Sep. 1, 2020

(54) ENLARGER FOR DIGITAL PHOTOGRAPHS ON PHOTOGRAPHIC PAPER UTILIZING A SOFTWARE APPLICATION

(71) Applicant: Charles Beseler Company, Stroudsburg, PA (US)

(72) Inventor: Matthew L. Schwartz, Chester Springs, PA (US)

(73) Assignee: Charles Beseler Company, Stroudsburg, PA (US)

( * ) Notice: Subject to any disclaimer, the term of this patent is extended or adjusted under 35 U.S.C. 154(b) by 0 days.

(21) Appl. No.: 16/569,087

(22) Filed: Sep. 12, 2019

(65) Prior Publication Data

US 2020/0092428 A1 Mar. 19, 2020

Related U.S. Application Data

(60) Provisional application No. 62/730,708, filed on Sep. 13, 2018.

(51) Int. Cl.
*G06F 15/00* (2006.01)
*G06F 3/12* (2006.01)
(Continued)

(52) U.S. Cl.
CPC ....... *H04N 1/00411* (2013.01); *G03B 27/727* (2013.01); *H04N 1/00251* (2013.01)

(58) Field of Classification Search
CPC ........... H04N 1/00411; H04N 1/00251; G06B 27/727
(Continued)

(56) References Cited

U.S. PATENT DOCUMENTS 4,371,259 A 2/1983 Howitt
5,239,339 A * 8/1993 Ziegler ................ G03B 27/582
355/43

(Continued)

FOREIGN PATENT DOCUMENTS

CN 1945426 2/1994
JP 6043551 4/2007
WO 2003053696 7/2003

OTHER PUBLICATIONS

De Vere: "De Vere 504DS Digital Enlarger", , Jan. 1, 2004 (Jan. 1, 2004), XP055648431, Retrieved from the Internet: URL:http://odyssey-sales.co.uk/wp-content/uploads/devere-504ds.pdf.
(Continued)

*Primary Examiner* — Douglas Q Tran
(74) *Attorney, Agent, or Firm* — Volpe and Koenig, P.C.

(57) ABSTRACT

An apparatus and method for enlarging digital photographs in a dark room environment by interchanging the film carrier with a digital projection module, wirelessly receiving the digital photograph data within the digital projection module and then automatically and wirelessly configuring the enlarger to generate the enlarged photograph on photosensitive printing paper. The apparatus and method include a software application for use on a computing device containing the digital photographs that permits the user to wirelessly communicate with the enlarger to configure and control the enlarger for printing. The digital projection module permits the enlarger to be easily reconfigured for enlarging photographs produced from film. An alternative is also disclosed that uses a laser projector instead of the interchangeable digital projection module for generating enlarged prints from digital photographs. The software application also permits burn and dodge effects in the print.

20 Claims, 24 Drawing Sheets

(51) Int. Cl.
*G06K 1/00* (2006.01)
*H04N 1/00* (2006.01)
*G03B 27/72* (2006.01)

(58) Field of Classification Search
USPC .............................. 358/1.15, 1.1, 1.13, 1.14
See application file for complete search history.

(56) References Cited

U.S. PATENT DOCUMENTS

| | | |
|---|---|---|
| 5,260,805 A | 11/1993 | Barrett |
| 5,583,610 A | 12/1996 | Yoshikawa |
| 5,636,001 A | 6/1997 | Collier |
| 5,801,814 A | 9/1998 | Matsumoto |
| 6,580,490 B1 | 6/2003 | Wong et al. |
| 6,642,970 B1 | 11/2003 | Takeuchi et al. |
| 6,741,325 B2 | 5/2004 | Yamamoto |
| 6,829,036 B1 | 12/2004 | Asbury, III |
| 7,092,116 B2 | 8/2006 | Calaway |
| 2003/0147129 A1 | 8/2003 | Gohner |
| 2004/0119990 A1 | 6/2004 | Miller et al. |
| 2005/0083350 A1 | 4/2005 | Battles |
| 2005/0105144 A1* | 5/2005 | Konagaya .......... H04N 1/19589 358/497 |
| 2011/0249248 A1 | 10/2011 | Gu |

OTHER PUBLICATIONS

Dpreview Staff: "Enfojer project turns your smartphone into an enlarger for B&W prints", Internet Citation, Sep. 8, 2013 (Sep. 8, 2013), XP002786195, Retrieved from the Internet: URL:https://www.dpreview.com/articles/5297127597/enfojer-project-aims-to-create-smartphone-enlarger-for-b-w-prints.

\* cited by examiner

FIG. 12E
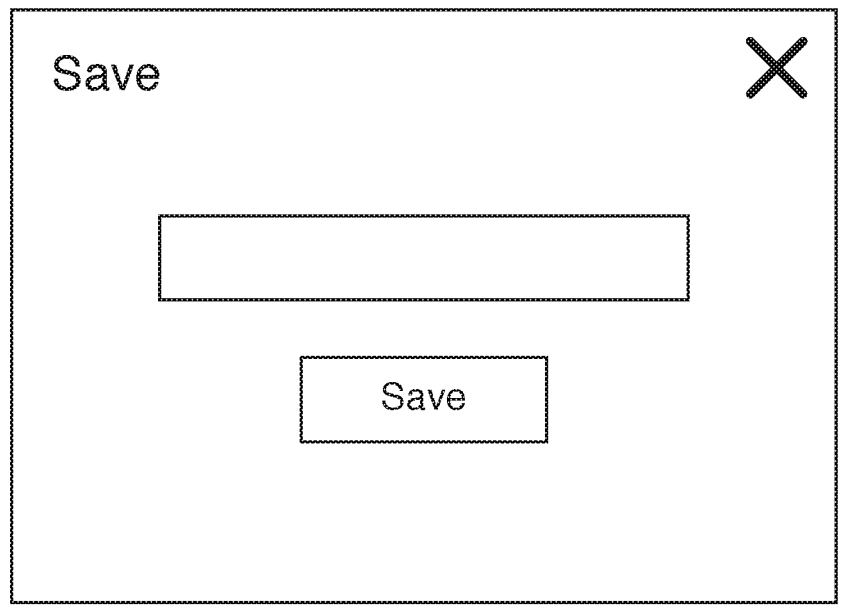
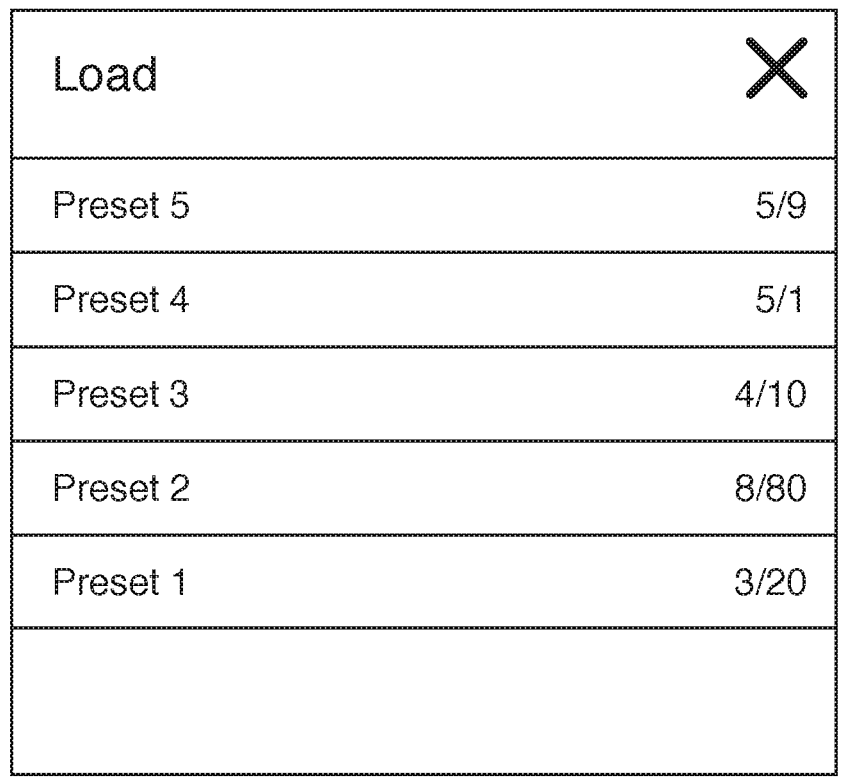
FIG. 12F

ENLARGER FOR DIGITAL PHOTOGRAPHS ON PHOTOGRAPHIC PAPER UTILIZING A SOFTWARE APPLICATION

CROSS REFERENCE TO RELATED APPLICATIONS

This application claims the benefit of U.S. Provisional Patent Application Ser. No. 62/730,708, filed Sep. 13, 2018, the contents of which are hereby incorporated by reference herein.

BACKGROUND OF THE INVENTION

The present invention relates generally to printing of photographs from digital images and, more particularly, to an apparatus and method for printing enlarged photographs from digital images using either existing photographic enlargement equipment or new enlargement equipment.

A current photographic enlarger (see FIG. 1), also called projection printer, in photography, is a device for producing a photographic print or negative larger than the original negative or transparency in a dark room environment. The modern enlarger consists of a projection assembly attached to a vertical column that is mounted on a horizontal base. The projection assembly includes an enclosed illumination system, a film carrier or holder for positioning and flattening the film, a lens for projecting the image onto the base (which holds a photosensitive printing paper), and a mechanism for focusing the image onto the paper. The entire assembly can be raised or lowered in a track on the column to adjust the size of the print by manual controls. Once the enlarged image is captured on the photosensitive printing paper, that paper is then processed through a print development stage in the dark room.

With the advent of digital cameras and smartphones, there is no longer any actual "film" to be placed in the enlarger device. Instead, enlargements of digital photographs are achieved using liquid crystal displays (LCDs) installed in the enlarger devices that can configure the digital data under the enlarger's illumination/lens system. Examples of such enlargers, or other photograph development equipment, using LCDs are shown in the following: U.S. Pat. No. 6,741,325 (Yamamoto); U.S. Pat. No. 5,801,814 (Mastumoto); U.S. Patent Publication Nos. 2003/0147129 (Gohner); 2011/0249248 (Gu); Japanese Patent No. JP6043551A (Bueruneru, et al.); Chinese Patent No. CN 1945426 (Wu, et al.); WO 03/053696 (Carima).

While the aforementioned devices may be generally suitable for their intended purposes, they suffer from several drawbacks, e.g., photograph enthusiasts do not want to forego the ability to enlarge film-based photographs as well as digital photographs. Thus, there remains a need for having a photograph enlarger device that has an interchangeable film carrier and LCD stage. Furthermore, these same photograph enthusiasts want to be able to reproduce the precise enlargement settings (e.g., the illumination/lens height, aperture settings, timing of exposure, etc.) without a lot of trial and error. Thus, there also remains a further need for automatically controlling the enlarger device settings and to be able to do so using wireless communication with the enlarger device.

Finally, there also remains a need to provide an alternative digital photograph enlarger which also comprises automatic and wireless adjustment but uses a laser projector which is more compact and consolidated than an interchangeable film carrier-LCD stage enlarger. The subject invention addresses the needs of the prior art.

All references cited herein are incorporated herein by reference in their entireties.

BRIEF SUMMARY OF THE INVENTION

A photograph enlarger for enlarging digital photographs onto a photosensitive material is disclosed. The photograph enlarger includes an enlarger stand from which an enlarger chassis projects and a carriage comprising a light source, a condenser, a focal lens, and a removable projector module. The carriage is connected to a support that is displaceable along the enlarger chassis for allowing the carriage to be positioned at a desired height above the enlarger stand to effect a desired enlargement size when a digital photograph is projected using the projector module and the light source is energized to form an enlarged photographic image for exposing a photo-sensitive material positioned on the enlarger stand under the focal lens.

A method for enlarging digital photographs onto photosensitive material is disclosed. The method includes receiving a digital photograph at a photograph enlarger, the photograph enlarger comprising an enlarger stand from which an enlarger chassis projects, and a carriage comprising a light source, a condenser, a focal lens, and a removable projector module, wherein the carriage is connected to a support that is displaceable along the enlarger chassis for allowing the carriage to be positioned at a desired height above the enlarger chassis, illuminating a base of the enlarger with an image preview, adjusting height of the enlarger chassis to adjust size of the image preview, and exposing a photosensitive material through the removable projector module.

A photograph enlarging system is disclosed. The photograph enlarging system includes a photograph enlarger and a computing device configured to execute a software application configured to control the enlarger to generate an image on a photosensitive material by transmitting a digital photograph to a photograph enlarger, the photograph enlarger comprising an enlarger stand from which an enlarger chassis projects, and a carriage comprising a light source, a condenser, a focal lens, and a removable projector module, wherein the carriage is connected to a support that is displaceable along the enlarger chassis for allowing the carriage to be positioned at a desired height above the enlarger chassis, instructing the enlarger to illuminate a base of the enlarger with an image preview, instructing the enlarger to adjust height of the enlarger chassis to adjust size of the image preview, and instructing the enlarger to expose a photosensitive material through the removable projector module.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 12E is an exemplary burn and dodge save screen while FIG. 12F is an exemplary load display screen of burn and dodge parameters;

DETAILED DESCRIPTION OF THE PREFERRED EMBODIMENTS

Figure 1:
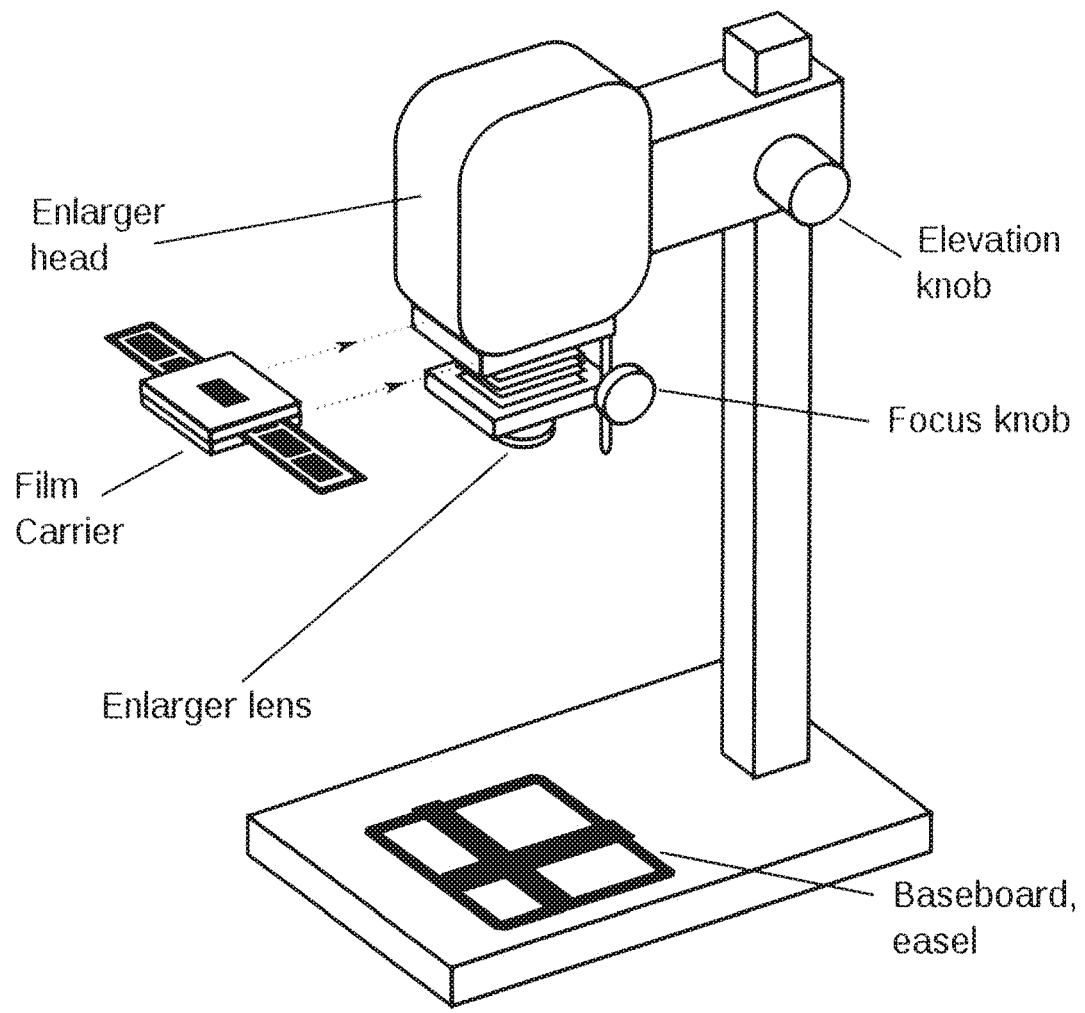
FIG. 1 is a functional diagram of a prior art conventional photograph film enlarger.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 2:
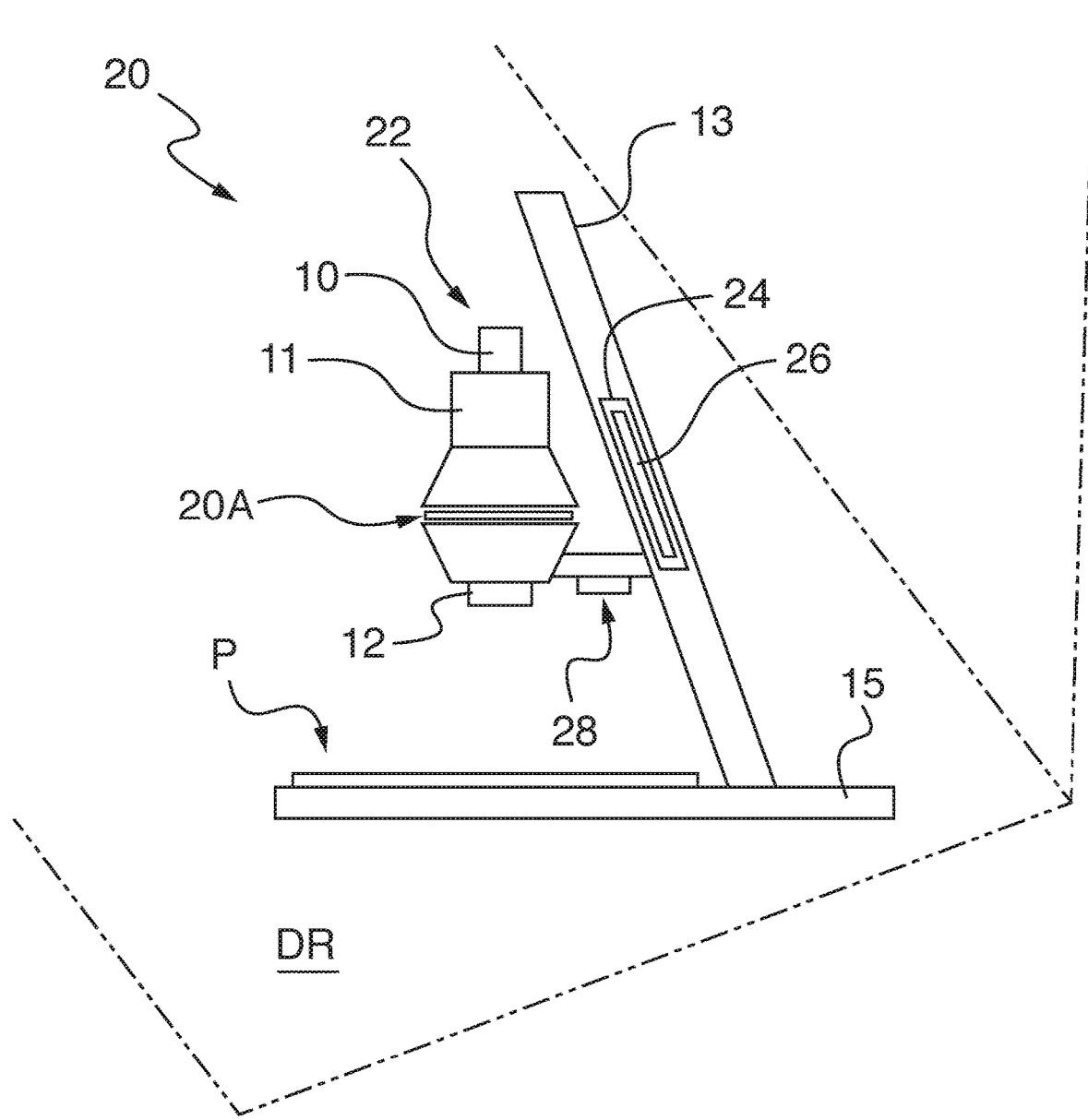
FIG. 2 is a side view of the present invention showing a photographic enlarger in a dark room utilizing an interchangeable LCD module.

As shown most clearly in FIG. 2, the enlarger 20 of the present application comprises, by way of example, a conventional photographic enlarger, the Beseler 23CIII-XL Condenser Enlarger with Baseboard, positioned in a dark room DR and wherein the film carrier has been removed and an interchangeable LCD (liquid crystal display) module 20A has been inserted between the enlarger's light source 10/condenser stage 11 and the enlarger's focal lens 12. It should be understood that the techniques of the present disclosure, including the use of an LCD module 20A to project an image on a photosensitive paper P, may be performed in any capable device, such as a convention or non-conventional photograph enlarger.

The light source 10, condenser stage 11, LCD module 20A and focal lens 12 all form an assembly or carriage 22 that is connected to an enlarger chassis 13 via a support 14 which can be displaced vertically along the chassis 13. The bottom of the enlarger chassis 13 is connected to an enlarger stand 15. The enlarger 20 comprises an enlarger mount 24 for automatically positioning the displaceable carriage 22 and wherein the enlarger mount 24 comprises electronics 26 for controlling the carriage displacement. The enlarger 20 further comprises an ultrasonic sensor 28 coupled to the underside of the support 14 for detecting the vertical position of the carriage 22 above the enlarger stand 15 and upon which the photosensitive printing paper P is placed.

Figure 3:
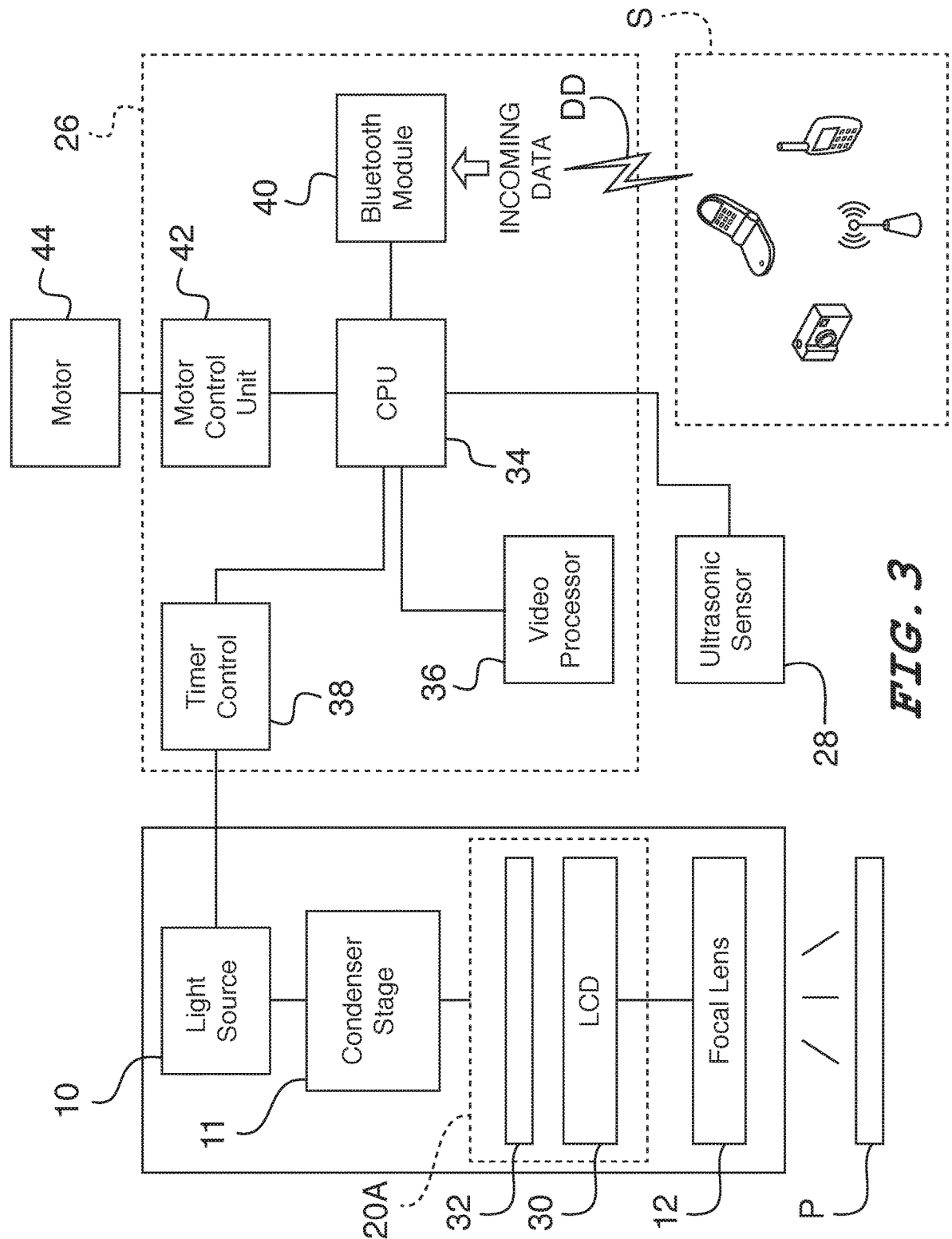
FIG. 3 is a block diagram of the photographic enlarger of the invention of FIG. 2 receiving digital photograph data from a variety of sources for print enlargement.

FIG. 3 illustrates details of an enlarger system including the enlarger 20 and a computing device S. Specifically, FIG. 3 provides a block diagram of the enlarger 20 showing digital photograph data DD arriving from the computing device S, which in various examples comprises a smart phone, a cell phone, a digital camera, or a different source. The interchangeable LCD module 20A comprises an LCD (e.g., 1481-1057-ND) 30 and a filter (e.g., Model 93493) 32. In various alternatives described elsewhere herein, the LCD module 20A is a laser projection module, a digital light projection module, or is any other projection module capable of projecting a digital image onto a photosensitive material.

The electronics 26 comprises a central processing unit (CPU) 34 (e.g., Arduino Uno Micro Controller) that communicates with a video processor 36 (e.g., MST3M182VGC-LF-Z1) including a timer control 38 (e.g., a software timer) for controlling the light source 10 (e.g., an incandescent bulb, light emitting diodes (LEDs) enlarger lamps, etc.). The CPU 34 controls both the timer control module 38 (viz., to control exposure time) and the video processor 36 to have the LCD 30 display digital image data so as to project an enlarged version of that data onto the photosensitive printing paper P. In particular, the light source 10 is used as the backlight for the LCD 30 while the CPU 34 commands the video processor 36 to transmit the video data to the LCD 30 for emitting the image. Although it is shown that digital data DD is received wirelessly, in an alternative implementation, the computing device is coupled to the enlarger 20 with a cable instead.

To also effect automatic control of the enlargement size, electronics 26 also include the ultrasonic sensor 28 (e.g., an HC-SR04 ultrasonic sensor) and a motor control unit 42 (e.g., L298N STMicroelectronics motor controller). The ultrasonic sensor detects the carriage 22 height above the photosensitive printing paper P and conveys that information to the CPU 34. The CPU 34 communicates with a motor control unit 42 to control the activation of a motor 44 (e.g., a DC motor) for precisely driving the carriage 22 up or down along the enlarger chassis 13 for effecting the particular enlargement size.

Figure 4:
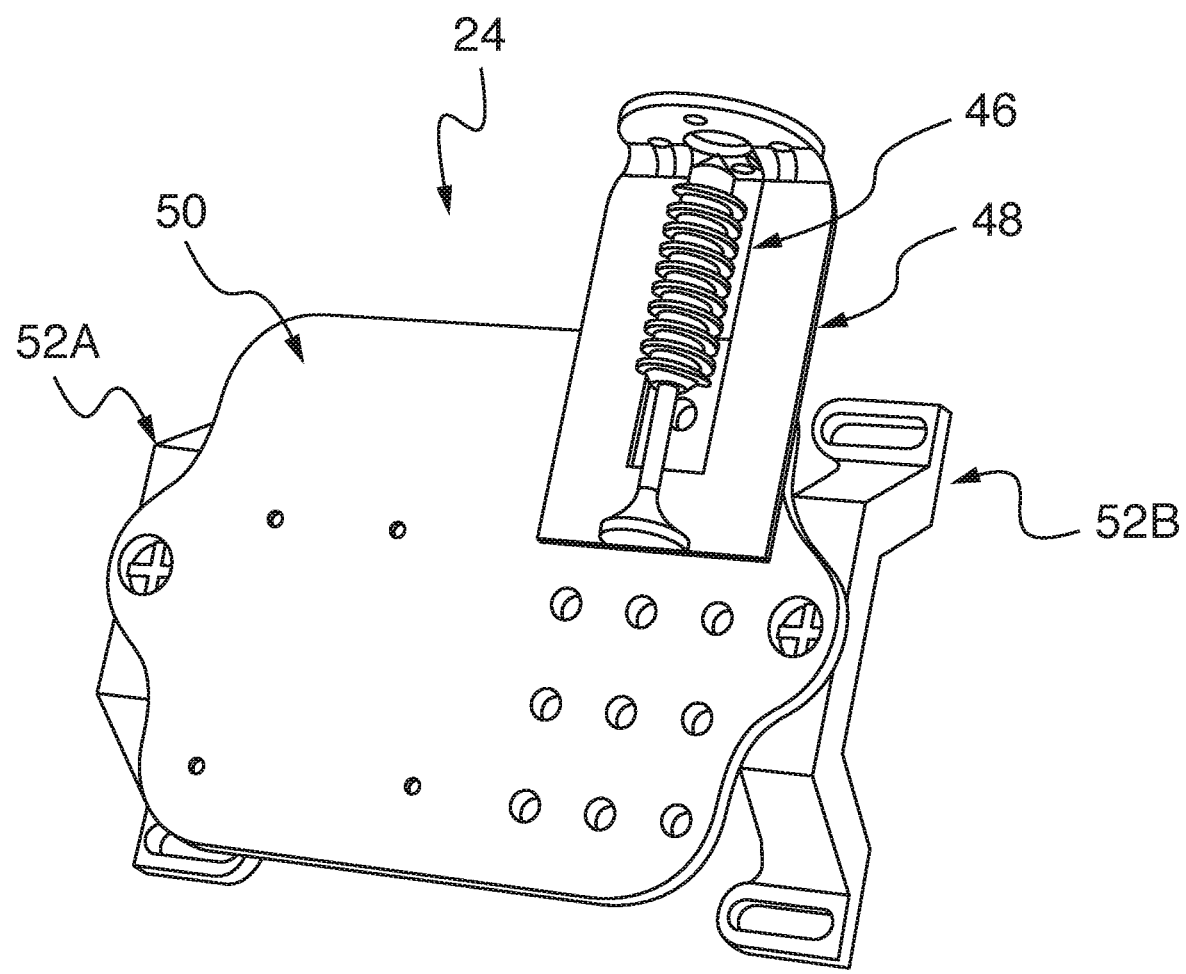
FIG. 4 is an isometric view of a base structure that houses the electronics of the present invention as well as the motor mount portion of the present invention.

FIG. 4 illustrates an example enlarger mount 24. In this example, carriage 22 displacement is achieved by the enlarger mount 24 that includes a worm gear configuration 46 which engages the motor 44 on a motor mount portion 48 that is connected to an enlarger mount base structure 50 which houses the electronics 26. A pair of mounting brackets 52A and 52B hold the base structure 50/motor mount portion 48 to the enlarger chassis 13.

Figure 5:
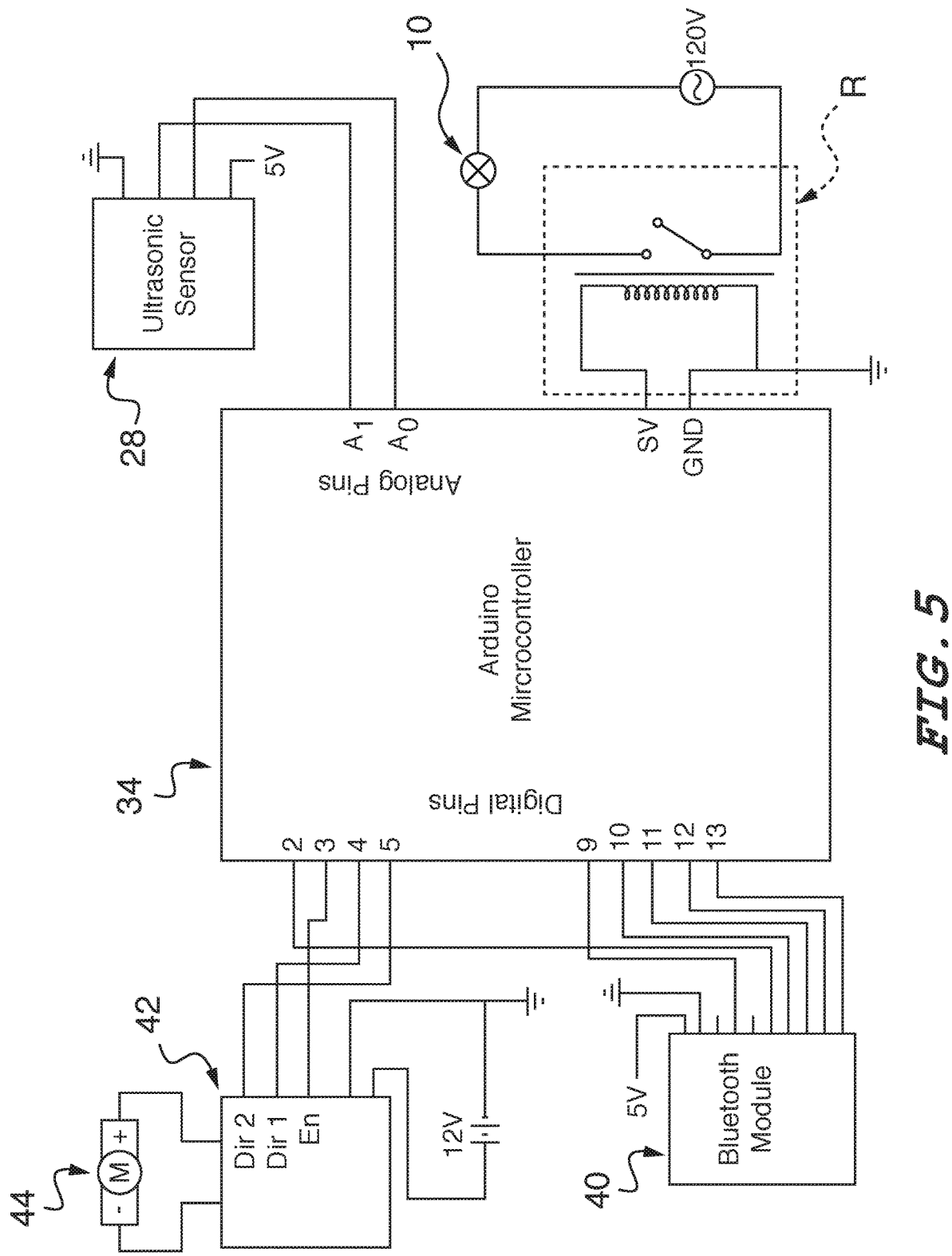
FIG. 5 is an exemplary electrical schematic of the present invention.

FIG. 5 depicts an exemplary electrical schematic for implementing features of the present disclosure. In this figure, the timer control module 38 is omitted and instead a relay circuit R has been implemented for controlling the light source 10 via the CPU 34. In particular, to cover incoming light from hitting the paper, relay R oscillates the light source on/off. The motor control unit 42 is controlled with 3 pins: Enable, Dir1, and Dir2, along with an external power source of 12 volts. The enable pins control the speed of the motor 44 and are hooked up to a PWM pin on the CPU 34. The PWM (pulse width modulation) establishes a waveform for the digital output to the motor which controls the speed. The ultrasonic sensor 28 requires two pins: one pin sends out a sonic pulse and the other pin counts the time it takes for the pulse to return to the sensor. The CPU 34 interface with the Bluetooth Module 40 spans most of the CPU pins because the module 40 has SPI (serial peripheral interface is an interface bus commonly used to send data between microcontrollers and small peripherals), I2C (serial protocol for 2-wire interface for connecting low-speed devices) and UART (universal asynchronous receiver/transmitter) capabilities.

Figure 6:
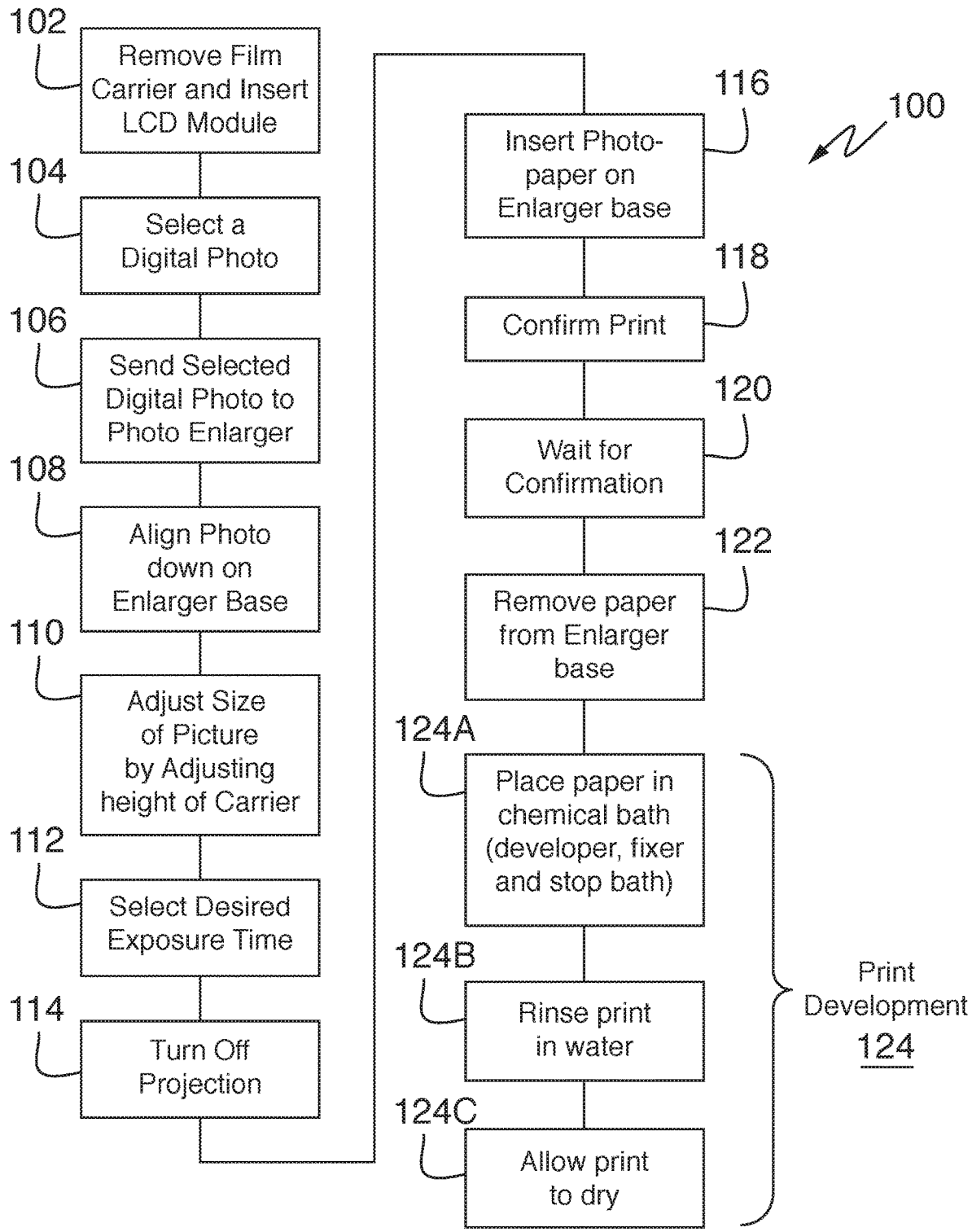
FIG. 6 is a flow diagram of the photograph enlargement process.

FIG. 6 illustrates an example process 100 for creating an enlarged photograph from a digital photograph using the enlarger 20. In some implementations, the operator uses a software application 200 (to be discussed later) to effect the majority of this process 100. In other implementations, some, most, or all of process 100 may be performed by the enlarger 20 automatically without being controlled by the software application 200. In various implementations, the software application 200 executes on the same computing device S that transmits the digital photograph data to the enlarger 20. In various implementations, a single software application 200 both transmits the digital photograph data to the enlarger 20 and controls the enlarger 20 according to process 100.

In step 102, the operator removes the film carrier from the enlarger and inserts the interchangeable LCD module 20A as discussed previously. Step 102 is optional as the enlarger may not include a film carrier. Thus in some implementations, step 102 does not occur. At step 104, the software application 200 selects a digital photograph. In some modes of operation, the software application 200 performs this selection automatically and in other modes of operation, the software application 200 receives such a selection from a human operator. The software application 200 then sends the selected photograph in step 106 to the enlarger 20 (e.g., via the Bluetooth module 40 of the enlarger electronics 26) and then configures the enlarger in steps 108-114 again using the software application 200. Specifically, the software application 200 adjusts the size of the picture by adjusting the height of the carrier (step 110), and selecting the desired exposure time (step 112). In some modes of operation, the software application 200 controls the enlarger to preview ("project") the enlarged image. If the software application 200 is controlling the enlarger in this manner, then the software application 200 switches off the projection at step 114. The projection that occurs is through the LCD 30 and filter 32, as well as through the focal lens 12.

After the steps described above, the exposure and development of the photosensitive paper occurs. The operator places the photosensitive printing paper P on the enlarger base 15 (step 116), confirms the print with the software application 200 (step 118), and waits for confirmation from the software application 200 (step 120). More specifically, at step 118, the software application 200 receives a notification from an operator to proceed in making the print and at step 120, the software application 200 controls the enlarger 20 to expose the photosensitive printing paper P. Step 118 is optional, as in some implementations, the software application 200 does not wait for human action to proceed with exposing the print. The software application 200 causes the enlarger 20 to expose the photosensitive printing paper P, thereby embedding the image on the photosensitive printing paper P. The exposure is performed according to enlarger configuration and photographic editing settings controlled by the software application 200 described elsewhere herein. For example, the exposure is controlled according to images edited through the software application 200 according to techniques include the elevation 240A, timer 242A, burn and dodge 244A, and stage timer 246A, described elsewhere herein. Once the enlarged image is embedded on the photosensitive printing paper P, the operator removes the paper P from the enlarger base 15 (step 122) and brings the paper P to the print development process 124, which comprises a chemical bath (step 124A), a rinse in water (step 124B) and a drying step (step 124C).

Software Application

Figure 7:
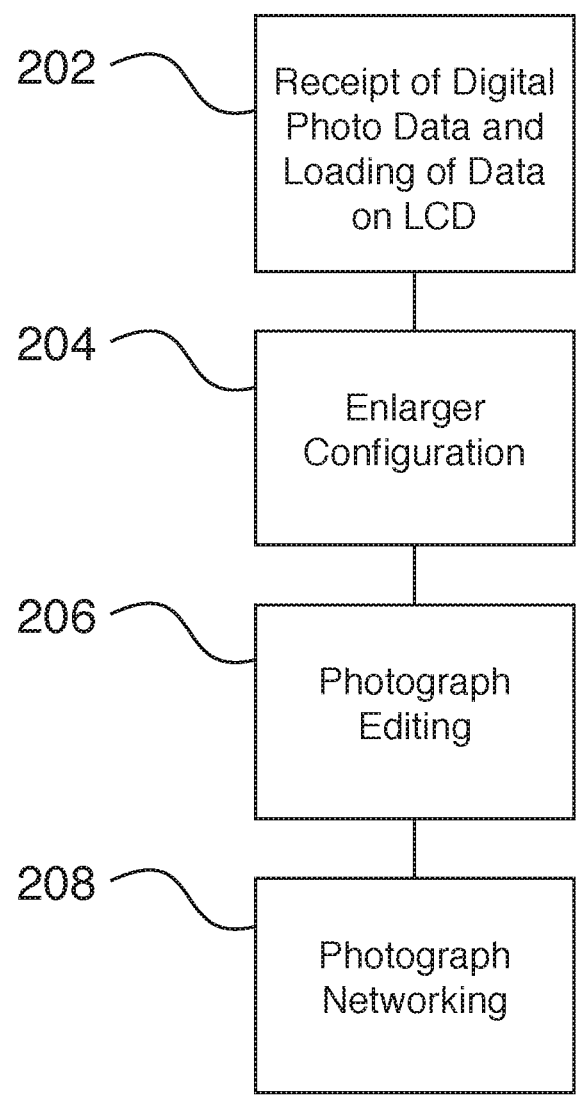
FIG. 7 depicts the four functions of the software application aspect of the present invention.

As described above, in some implementations, the enlarger 20 operates at the direction of or in conjunction with a software application 200. In various implementations, the software application 200 implements one or more of four functions (FIG. 7):

receipt of digital photograph data/loading of data on the LCD 202;

enlarger configuration 204 (e.g., motor control for carriage position, exposure time, etc.);

photograph editing 206 (e.g., drawing simple shapes over a photo, etc.,); and photograph networking 208 (e.g., creating an account, photograph sharing, photograph marketing, etc.).

In some examples, these four functions are implemented using a graphical user interface (GUI) comprised of various screens which are discussed below.

Figure 8:
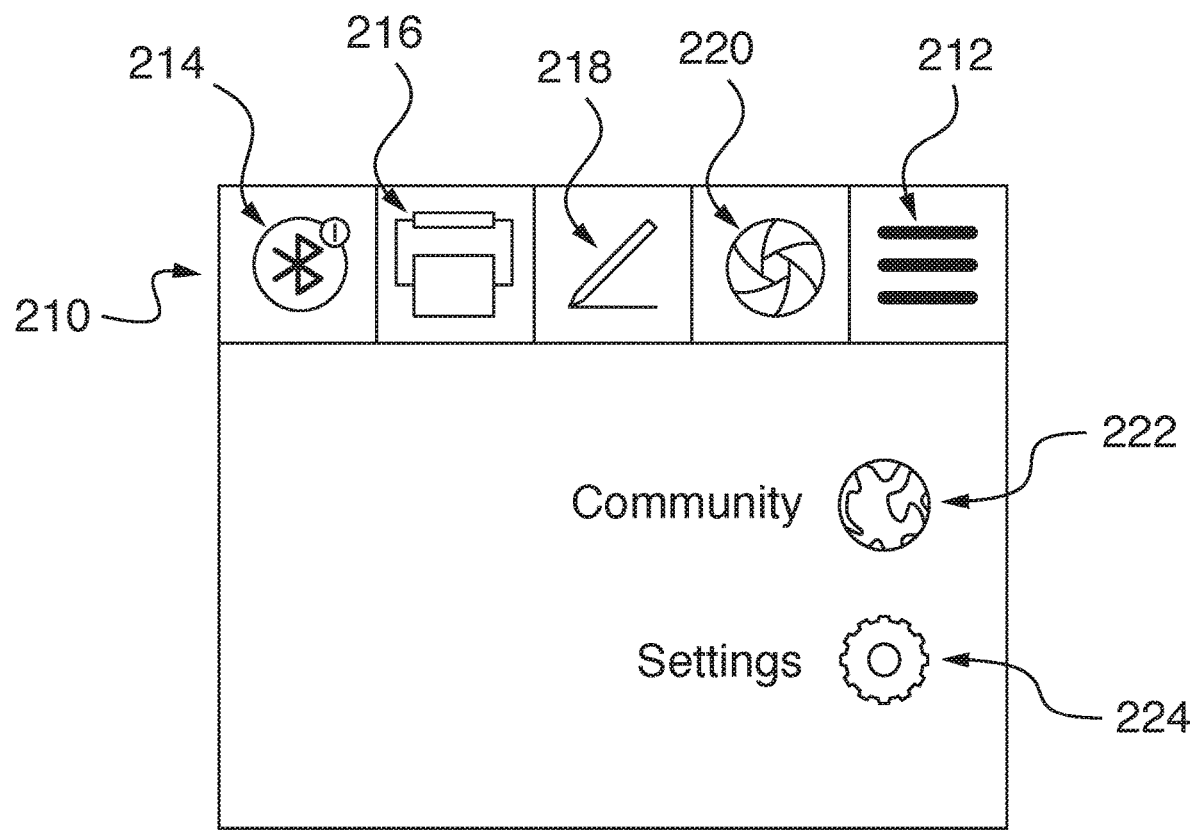
FIG. 8 depicts an exemplary screen that depicts a toolbar and menu button that appears on every screen in the software.

FIG. 8 depicts an exemplary screen that depicts a toolbar 210 and menu button 212 that appears on every screen in the software application 200. The toolbar 210 permits the operator to navigate from feature to feature to accomplish various tasks of the four functions. The toolbar 210 comprises a Devices tool 214, a Print tool 216, an Edit tool 218 and a Develop tool 220. A Community tool 222 and a Settings tool 224 are also provided.

Figure 9:
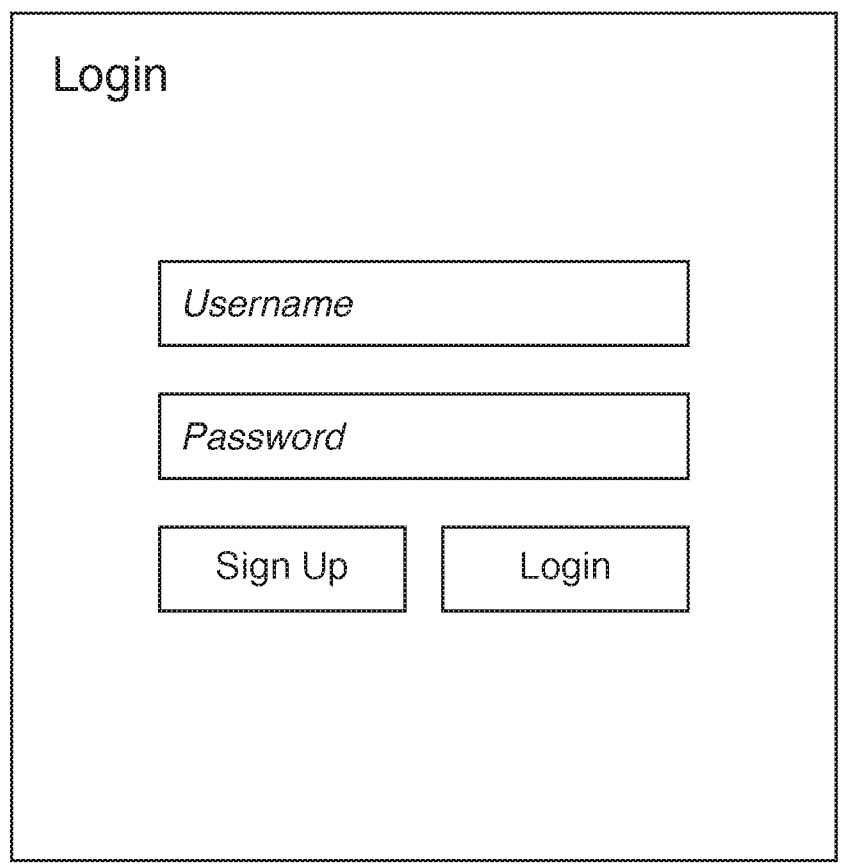
FIG. 9 depicts an exemplary login screen for the software application.

FIG. 9 depicts an exemplary login screen for the operator to log in to the software application 200.

Figure 10:
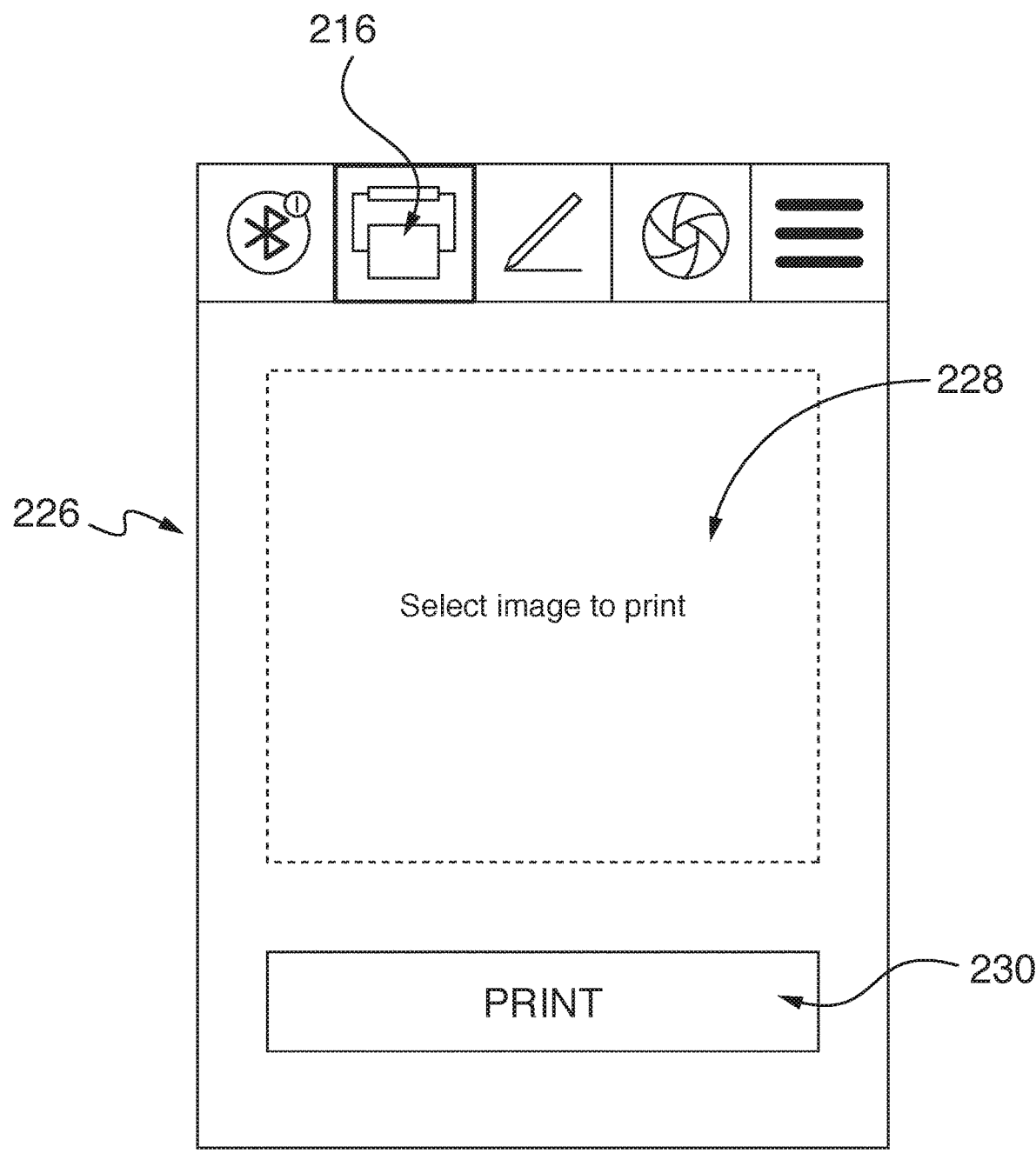
FIG. 10 depicts an exemplary print screen for the software application.

FIG. 10 depicts the print screen 226 according to an example. In some implementations, after login, the software application 200 displays the print screen 226. In this screen 226, the operator can tap/touch a photo selection/current photo viewer 228 which causes a camera roll to be available, thereby allowing the operator to select a photograph to be enlarged from a plurality of photographs. Once a photograph is selected, a black and white filter (not shown) is applied by the software application to invert the colors of the selected digital photograph so that it appears as a black and white negative in the viewer 228. At this point, the operator can be prompted to make another photograph selection if desired; if the software application 200 is on an iPhone, the "3D Touch" feature can be utilized to make the photograph swap. A print button 230 is provided in this screen 226 and pressing that button 230 transmits the digital data of the selected photograph as well as "initial conditions" (to be discussed later) to the enlarger. Upon receipt of this data, the enlarger runs the protocol set by the software application 200 and develops the image accordingly.

Figure 10A:
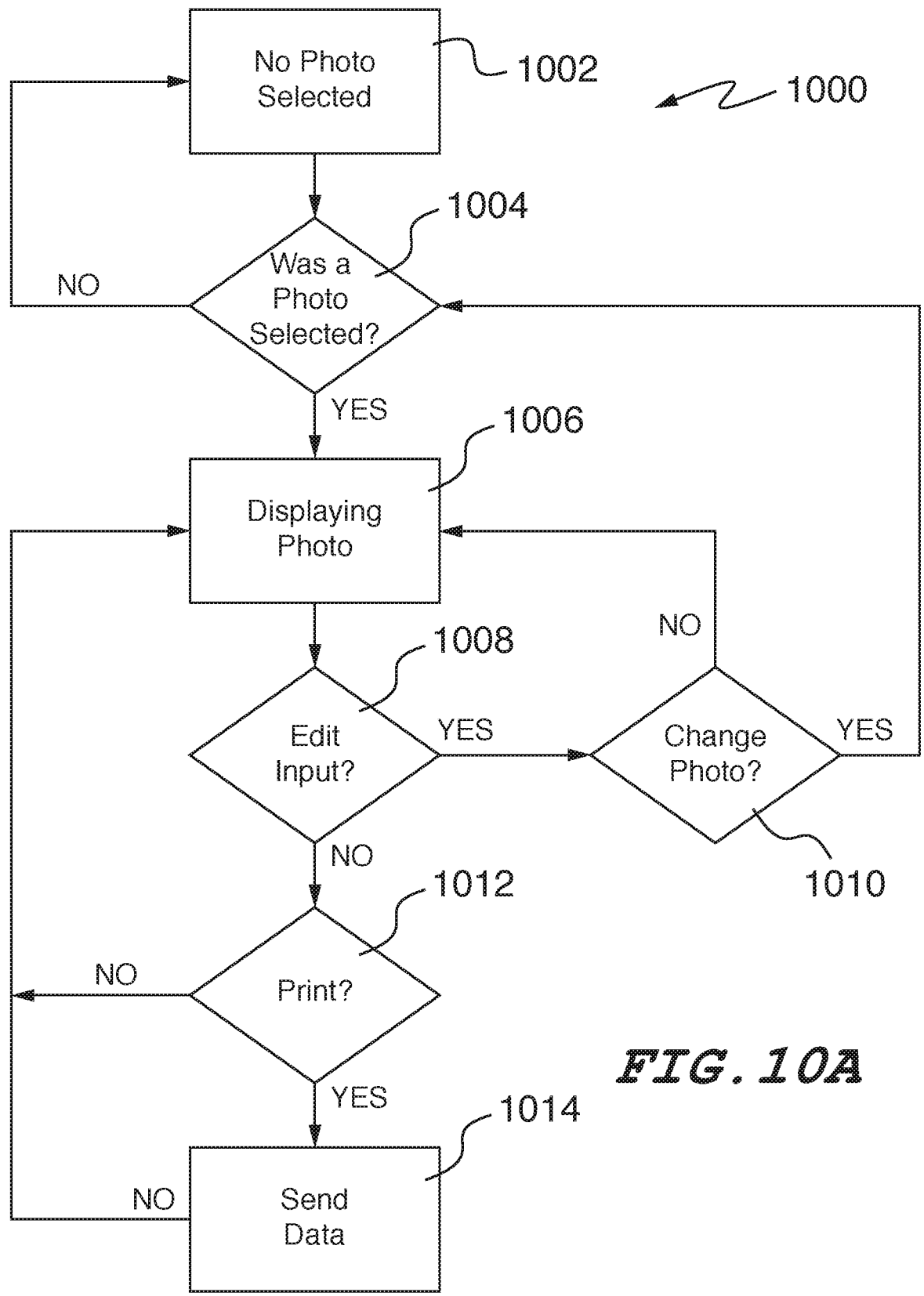
FIG. 10A depicts a flow diagram of a method for operation of the print screen according to an example.

FIG. 10A provides a flow diagram of the method 1000 for operation of the print screen 226 according to an example. At step 1002, no photo is selected in the print screen 226. At step 1004, the software application 200 determines whether a photo is selected. If a photo is not selected, the method 1000 returns to step 1002. If a photo is selected, then the method 1000 proceeds to step 1006. At step 1006, the software application 200 displays the selected photo. At step 1008, the software application 200 determines whether an editing input has been received. Example editing inputs include the elevation input 240A, the timer input 242A, the burn and dodge input 244A, and the stage timer 246A, all described elsewhere herein (e.g., in FIGS. 12-12F). If an editing input has been received, then the method 1000 proceeds to step 1010, where the software application 200 changes the photo according to the edit. If no editing input has been received, but instead a print command has been received at step 1012, then the method proceeds to step 1014, where the software application 200 sends data to the enlarger 20 to control the enlarger to generate the print. After step 1014, the method 1000 may return to step 1006 and again display the photo or the method 1000 may end.

Figure 11:
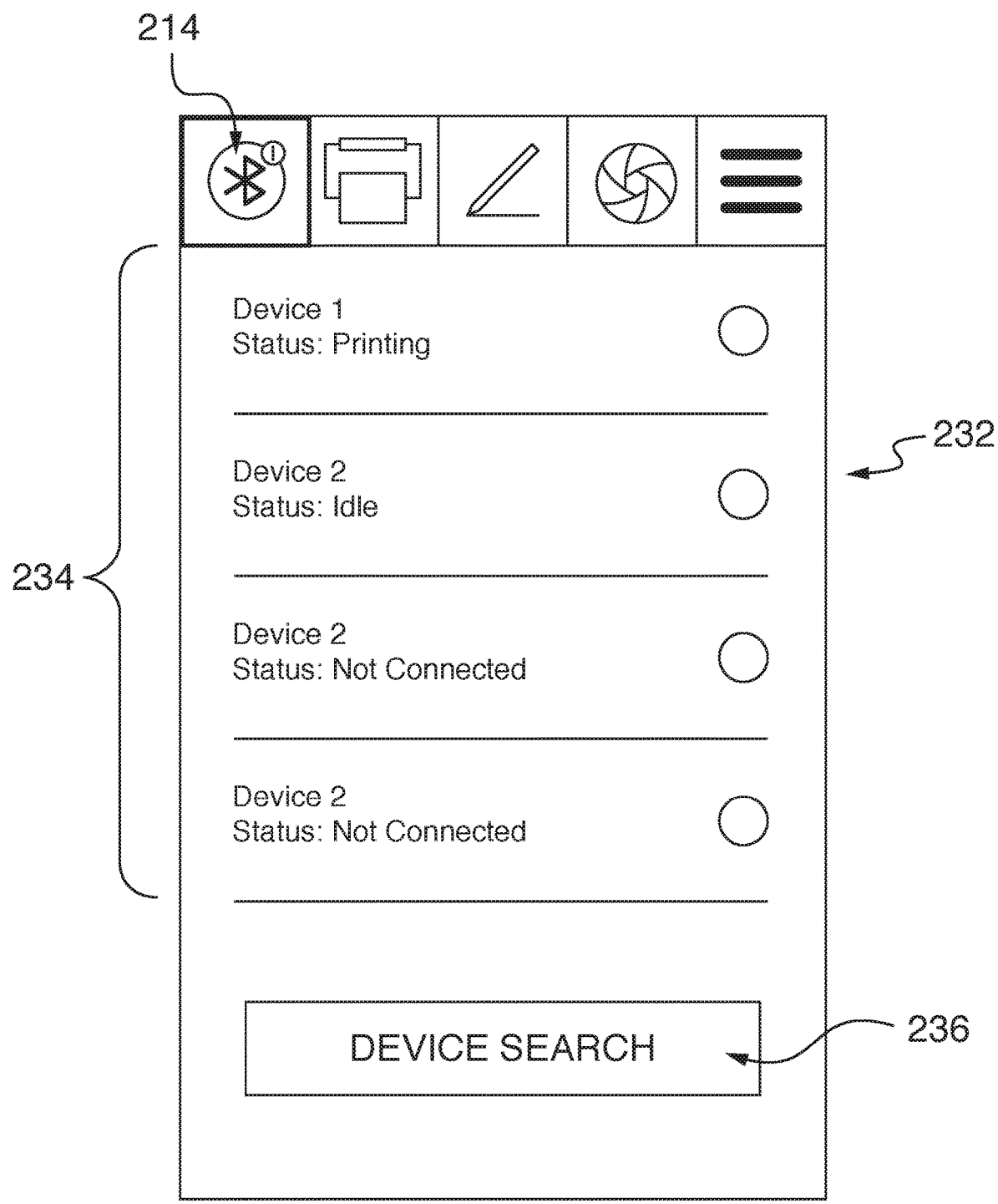
FIG. 11 depicts an exemplary devices screen which identifies all enlargers connected with software application and their status.

FIG. 11 depicts the Devices screen 232 that permits the operator to view and monitor the activity of connected enlargers. The network name of each device and its particular status are shown in the data field 234; the status indicators are green for "connected," yellow for "idle" and red for "disconnected." Although not shown, the Devices screen 232 also includes a data field for indicating the total number of devices that are currently connected. The Devices screen 232 is also where the operator pairs each enlarger device. A device search button 236 is provided to permit the operator to search for Bluetooth LE (low energy) peripherals in the vicinity.

Figure 12:
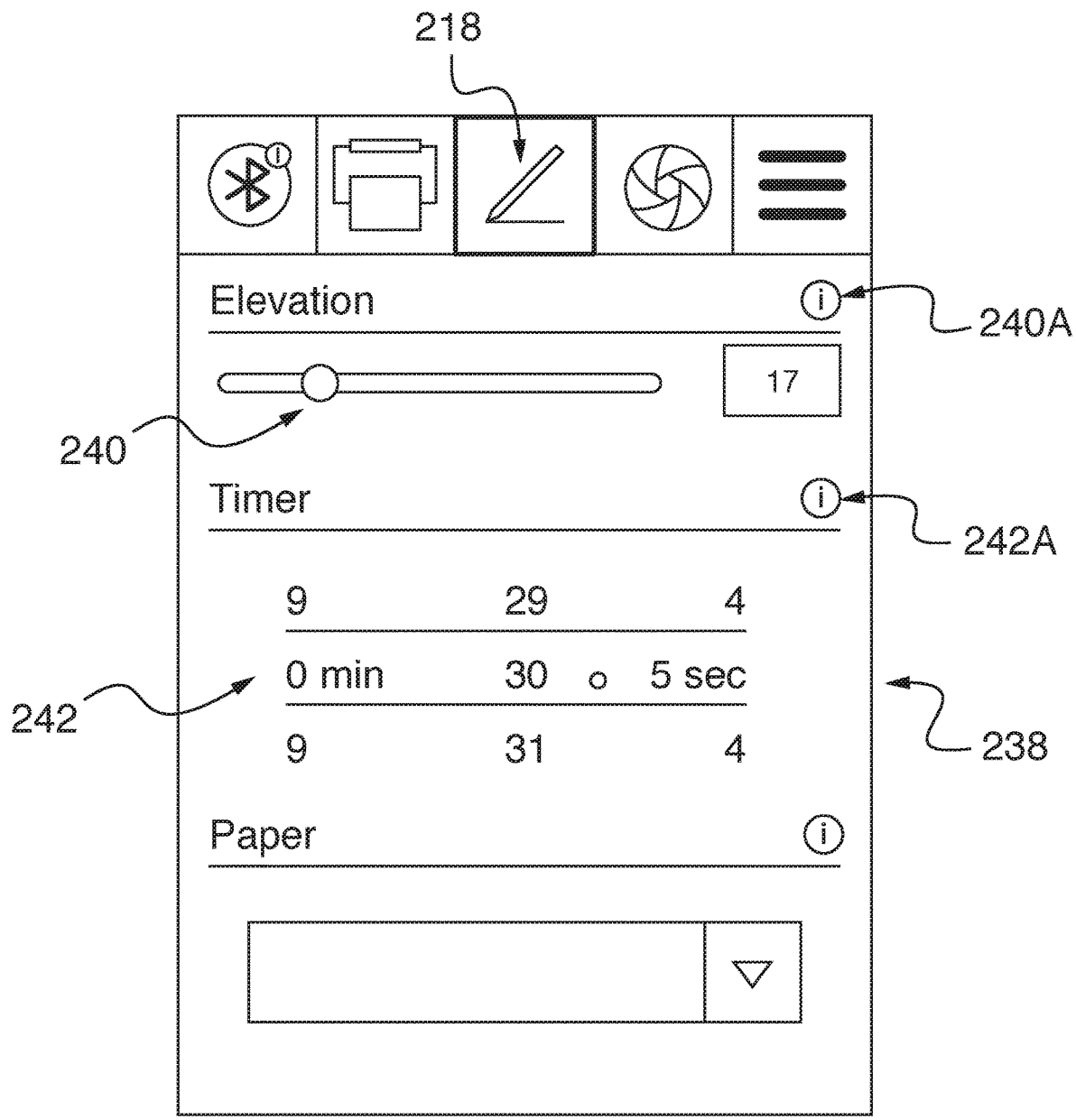
FIG. 12 depicts an exemplary initial conditions display screen of the software application for configuring the enlarger.
Figure 12A:
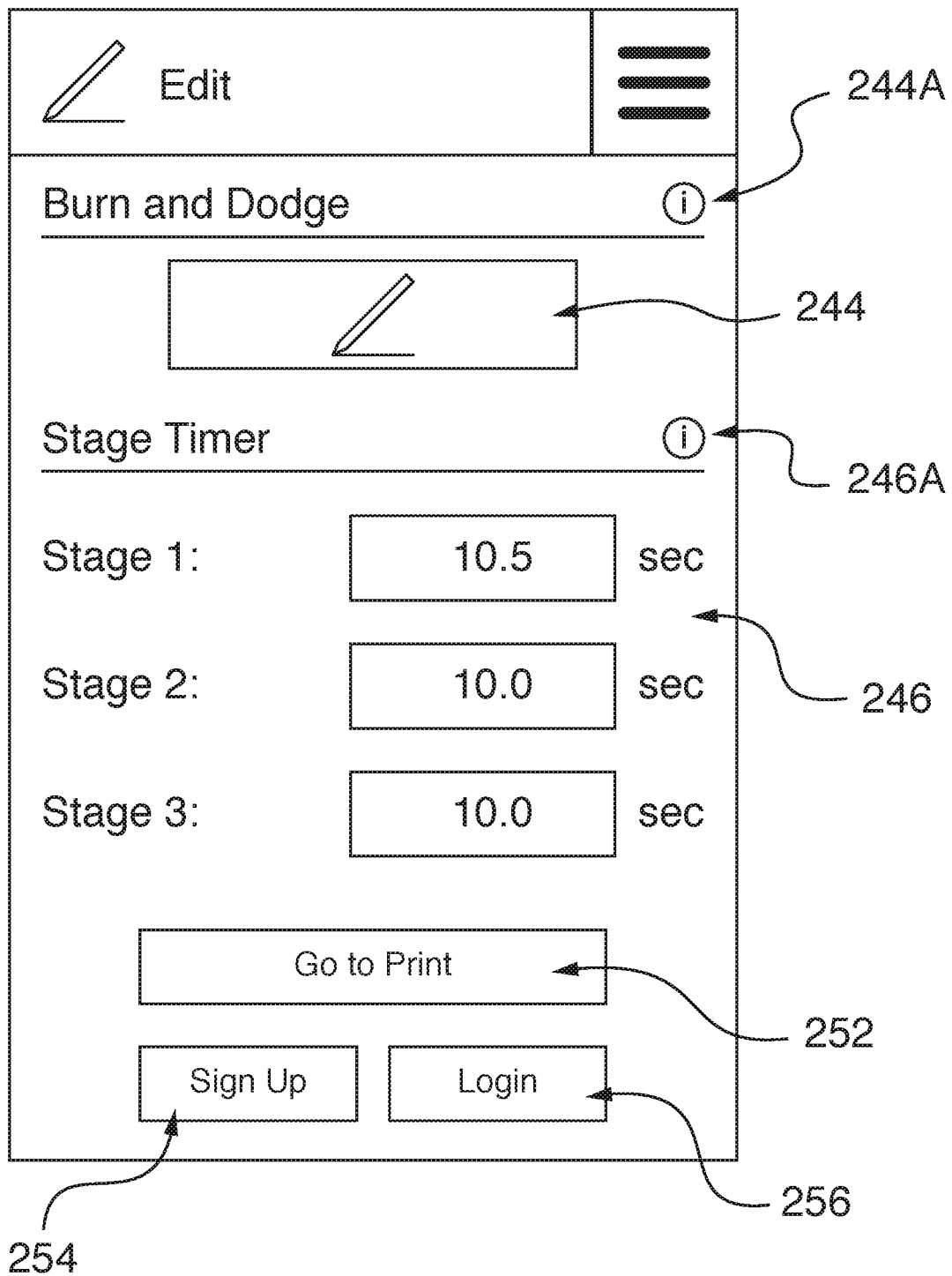
FIG. 12A depicts and exemplary edit display screen of the software application for implementing burn and dodge features in the photograph.
Figure 12B:
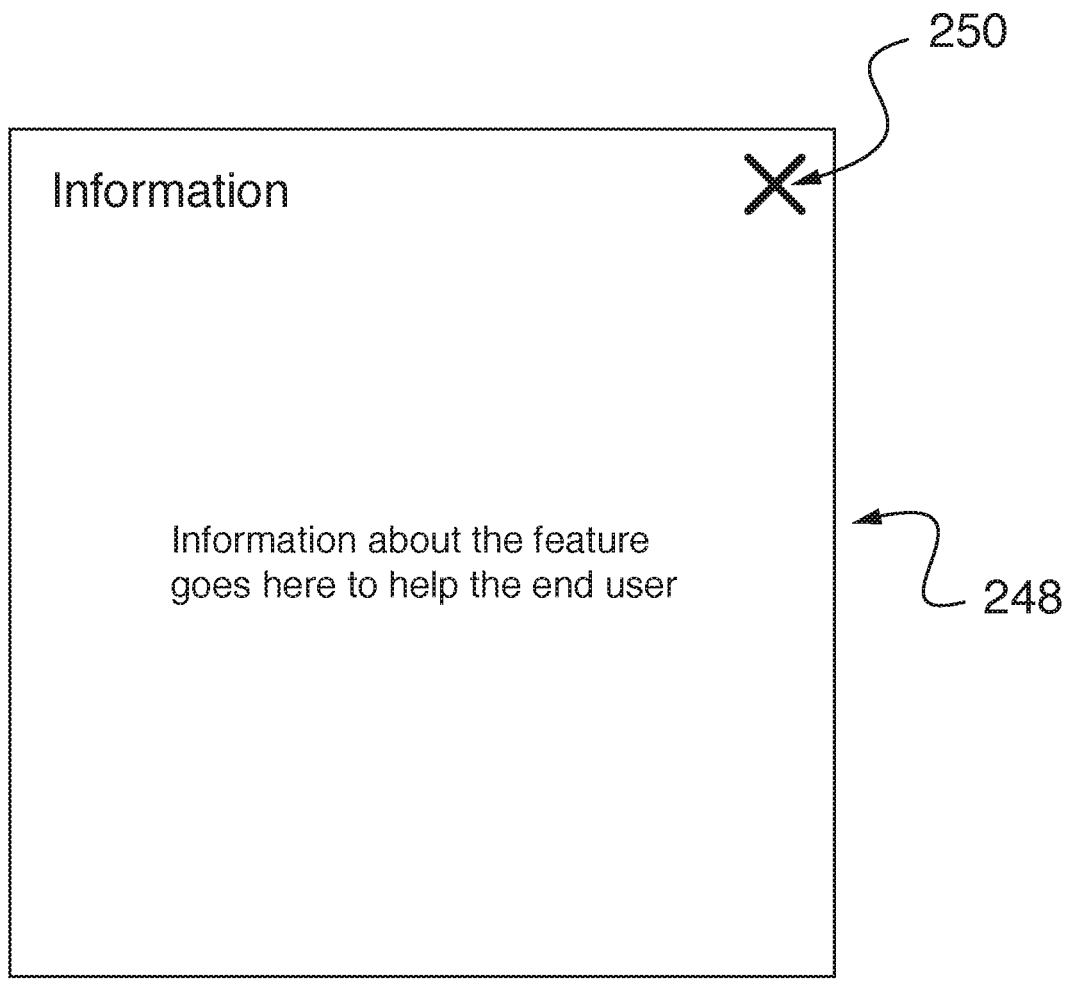
FIG. 12B depicts an exemplary information screen that describes the definitions of the various features in the initial conditions and edit display screens.

FIGS. 12-12F are the display screens of the software application 200 related to the initial condition for configuring the enlarger 20 as well as the print development process. As shown in FIGS. 12-12A, the Initial Conditions screen 238 directs the operator to establishing the Carriage Elevation Setting 240, the Master Timer Setting 242, the Burn and Dodge Settings 244 and the Stage Timer Settings 246. Respective information buttons 240A-246A provide the operator with information about the particular setting in a separate information screen 248 (FIG. 12B), namely:

Elevation 240A: Elevation controls the size of the print; increasing this parameter creates an enlarged image, whereas decreasing this parameter creates a reduced-sized image; a virtual slider control 240 allows the operator to have a wide range of elevation control.

Timer 242A: This parameter is the "master timer" parameter; this parameter determines the maximum exposure time for the image; a longer timer parameter results in a darker print development whereas a shorter timer parameter results in a lighter print development;

Burn and Dodge 244A: Burn and Dodge (BD) permits the operator to select certain areas of the print to receive less development; by drawing a snap over the image, this prevents light from developing in the selected area, thereby creating a softer tone in that area; in particular, the BD feature takes the uploaded image from the Print Screen 226 and permits the operator to draw simple shapes with black fill thereover. The result of the black fill is to adjust the degree of exposure of the image on the photosensitive material. The BD feature also saves the edited photo as a separate image temporarily to permit the enlarger to display it for a predetermined amount of time. In addition, any duplicates are treated as separate entities while assigning a stage time to that image which links to the stage timer section in a basic edit window.

Stage Timer 246A: The stage timer allows the operator to control the time that the BD images are exposed. The stage timer parameters cannot exceed the master timer.

The operator can exit out of the Informational screen using the close button 250.

Figure 12C:
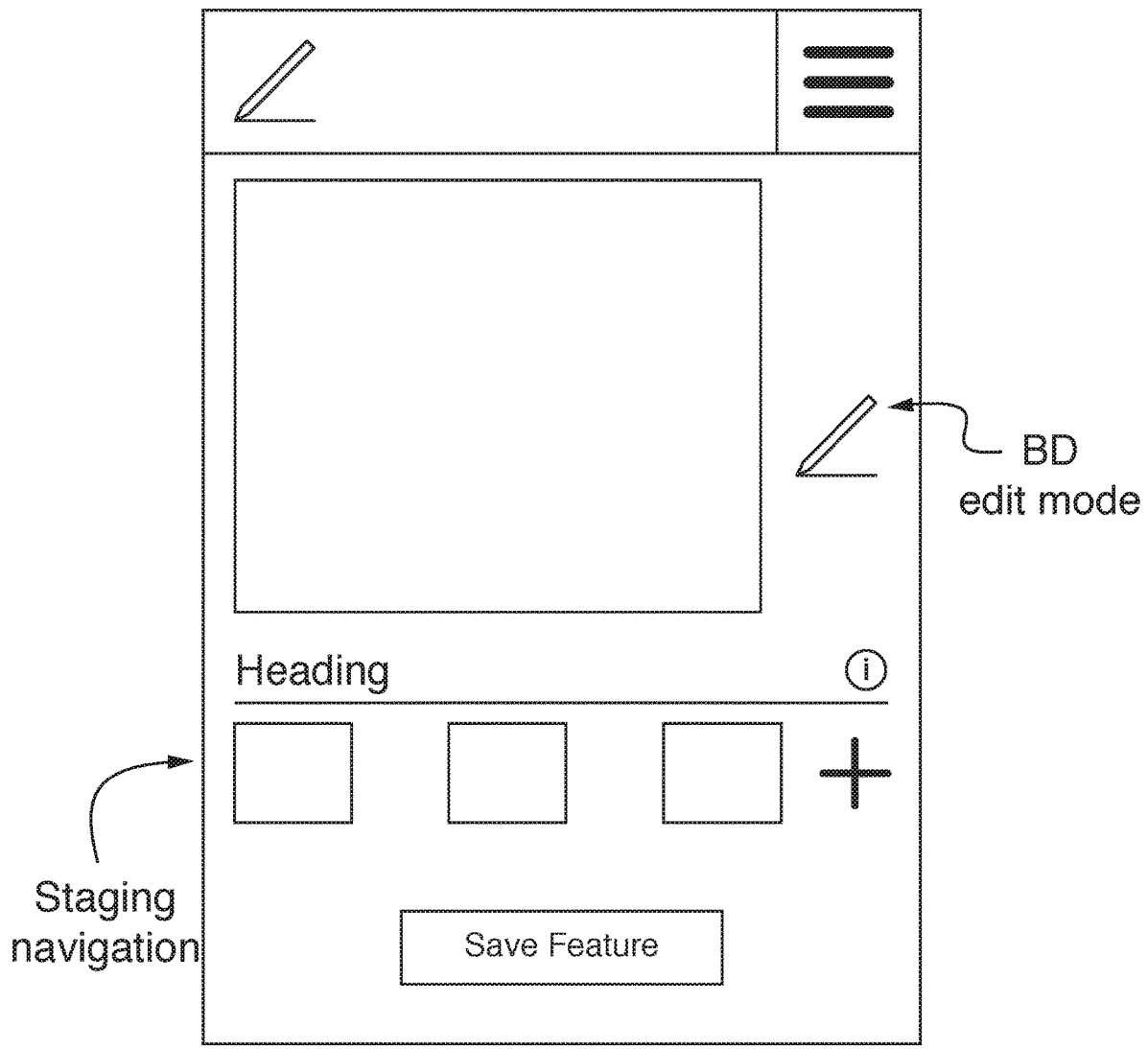
FIGS. 12C-12D depict exemplary burn and dodge feature display screens.
Figure 12D:
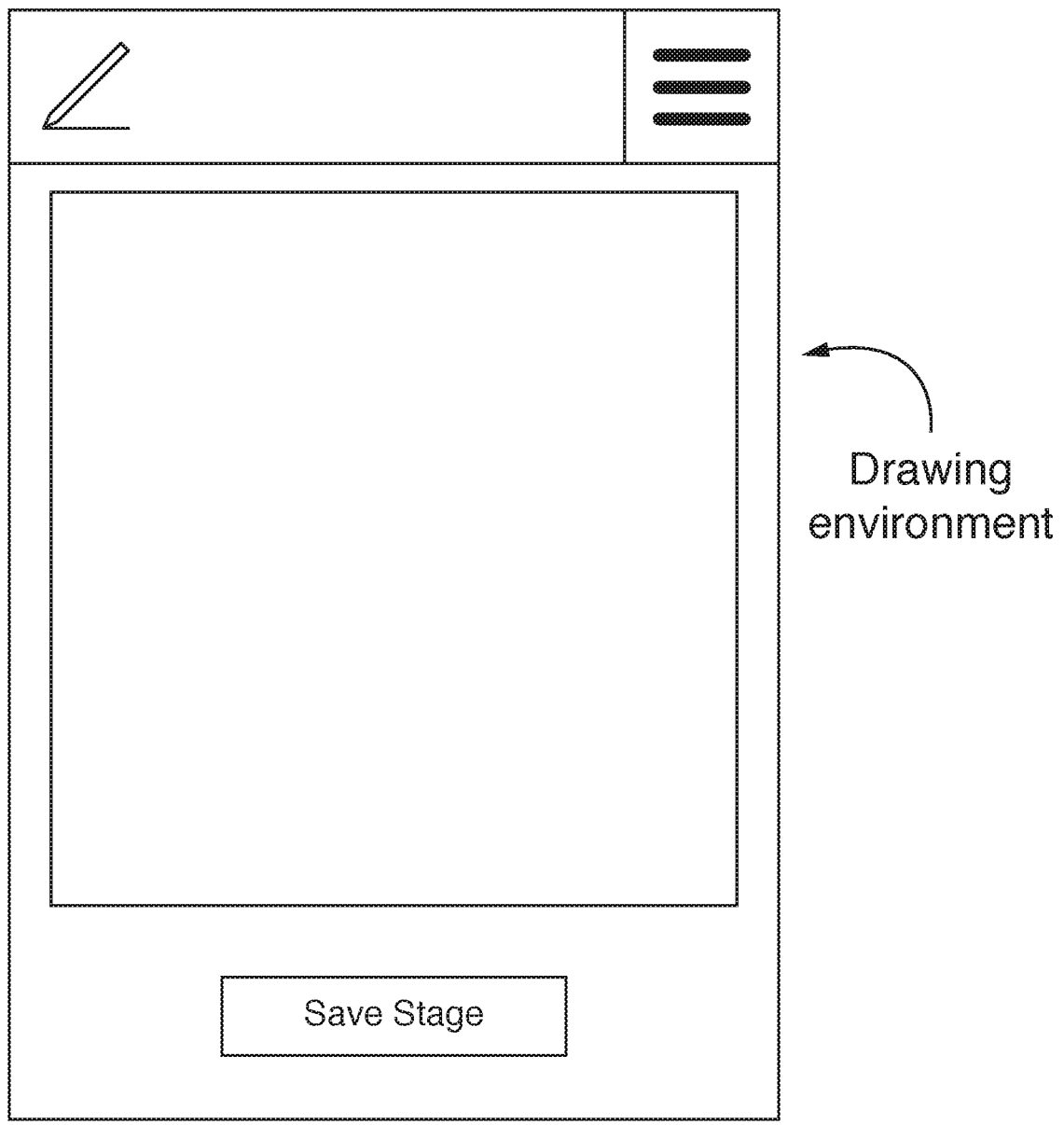

As can be seen most clearly in the Edit screen (FIG. 12A), the BD feature allows the operator to conduct simple photo editing, e.g., drawing simple shapes over top of an image and that those shapes have black fill. The stages (e.g., stages 1, 2 and 3) allow the operator to have multiple images appear at different times during the development stage and to behave exactly the same as a computer-driven slide show on a timer. The stage lengths are set in the respective timer data fields 246. By hovering over a particular Stage Timer Setting 246, the operator is brought to BD screens of FIGS. 12C and 12D to effect the particular editing. A "Go To Print" button 252 in FIG. 12A acts as a print screen short cut. A Save button 254 and a Load button 256 are also provided in the display of FIG. 12A which bring the operator to respective display screens shown in FIGS. 12E and 12F. These screens save the current parameters of all of the features on the software application 200 to be loaded again if the operator wishes to make an identical print which would also include the BD stages.

Figure 13:
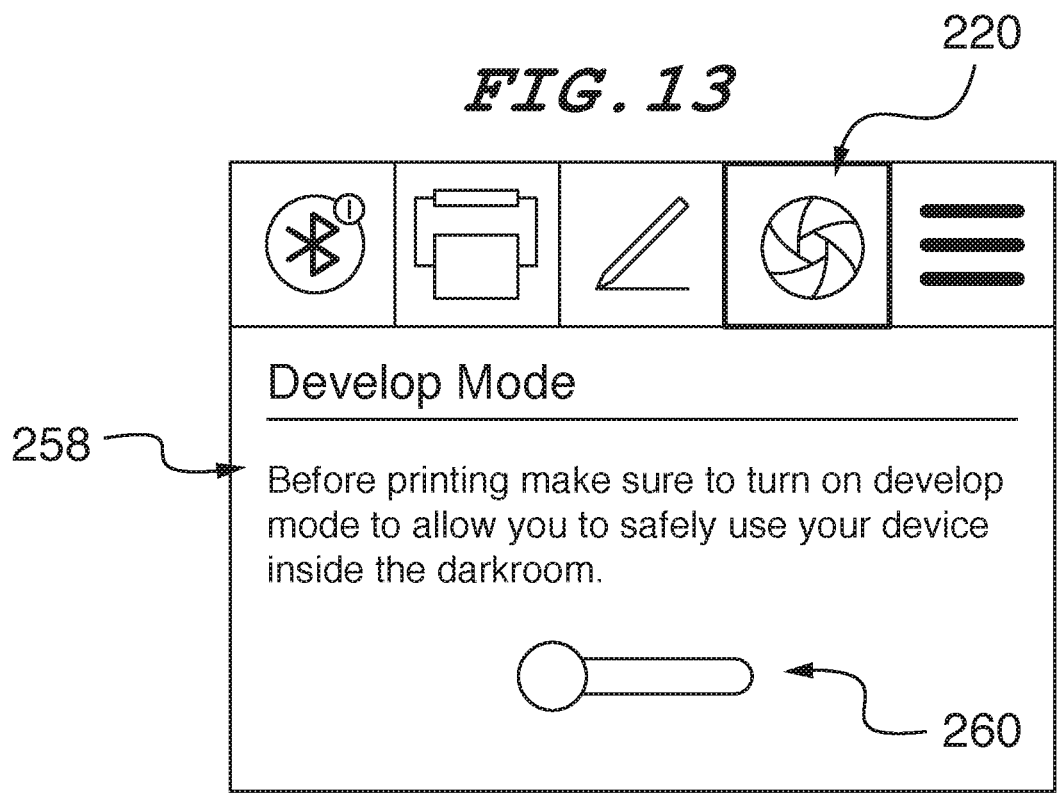
FIG. 13 is an exemplary develop mode display screen that enables the application of a red filter over the smartphone display screen being used in the dark room.
Figure 13A:
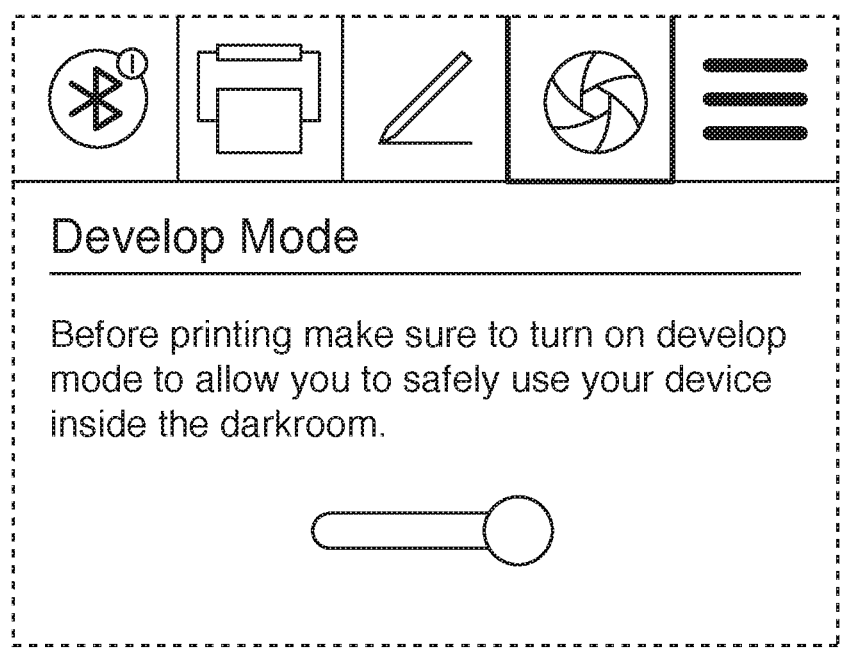
FIG. 13A depicts the red filter applied over the smartphone display screen using the develop mode display screen of FIG. 13.

FIG. 13 depicts the display screen 258 for the Develop tool 220. In particular, this display screen permits the operator to use his/her smartphone in the dark room without damaging the image by applying a red filter (FIG. 13A) to the smartphone display screen. Red light does not damage black and white prints. As such, by tinting the operator's smartphone's display screen, the prints are protected from any light emitting from the smartphone. A virtual slider control 260 permits the operator to impose the red filter over the smartphone display screen while in the dark room.

Figure 14:
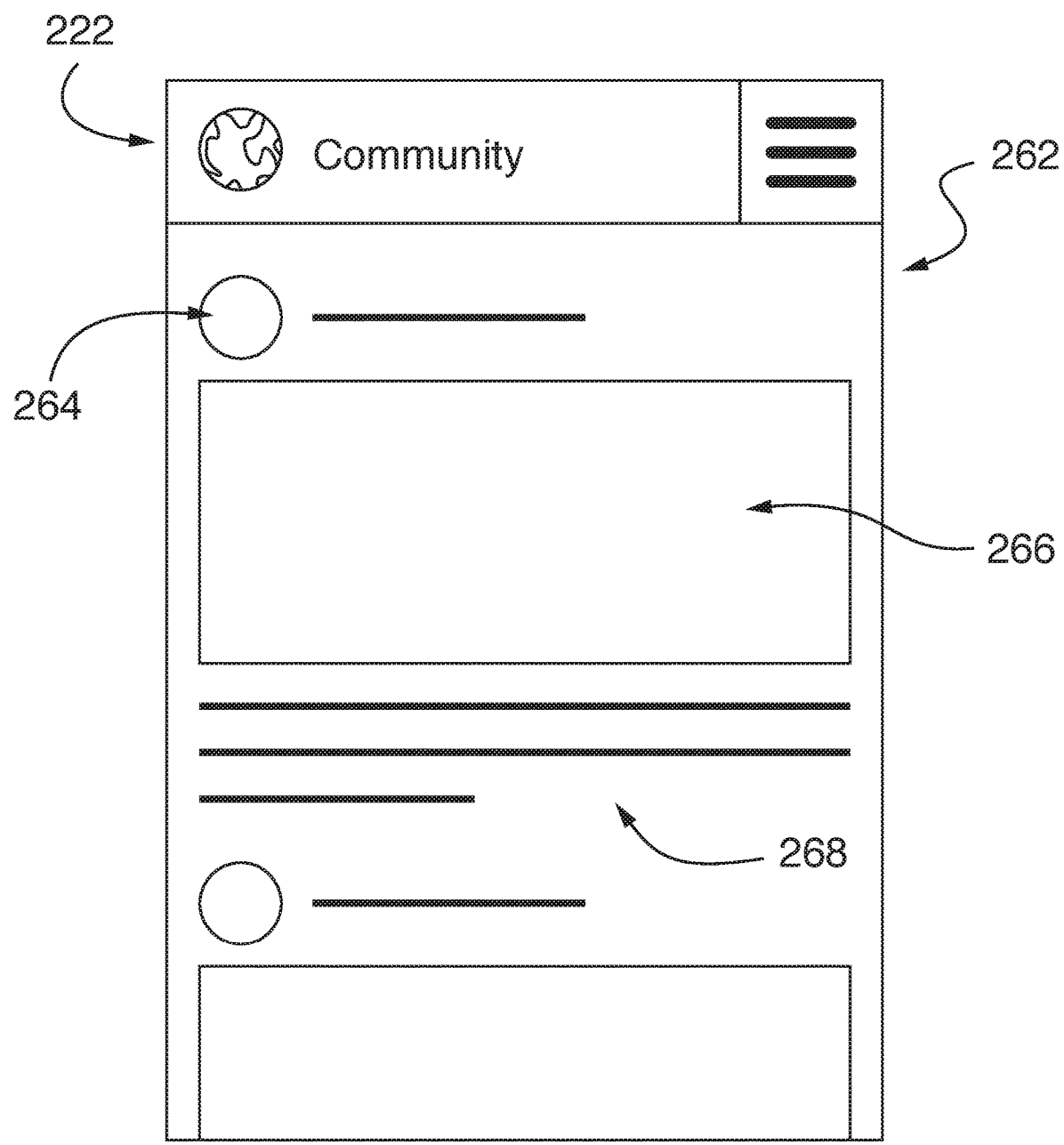
FIG. 14 depicts an exemplary community tool display screen.

FIG. 14 depicts the display screen 262 for the Community tool 222. In particular, the Community tool 222 allows the operator to post his/her images along with the parameters of the development process. These images and process parameters can be sold to others using an online marketplace. The purchase transfer involves a data packet including the image, the initial conditions, and any BD effects, thereby allowing the purchasers to reproduce the seller's image. The display screen 262 comprises an identification 264 of the account/user, the photograph 266 being purchased along with its parameters and a description/post data field 268.

Alternatives to the LCD Module: Laser Projector Module or Digital Light Processing In an alternative to using the LCD module 20A to generate an enlarged photograph from digital photograph data DD, an alternative projector module 300 (e.g., a Sony Laser Projector MP-CL1A-Lumen) is used with the enlarger in a dark room environment DR. In one example, the alternative projector module 300 is a laser projector module. In another example, the alternative projector module 300 is a digital light processing module. As used herein, the term "projector module" refers to any technically feasible module that performs the functions of the LCD module 20A, or the alternative projector module 300.

Figure 15:
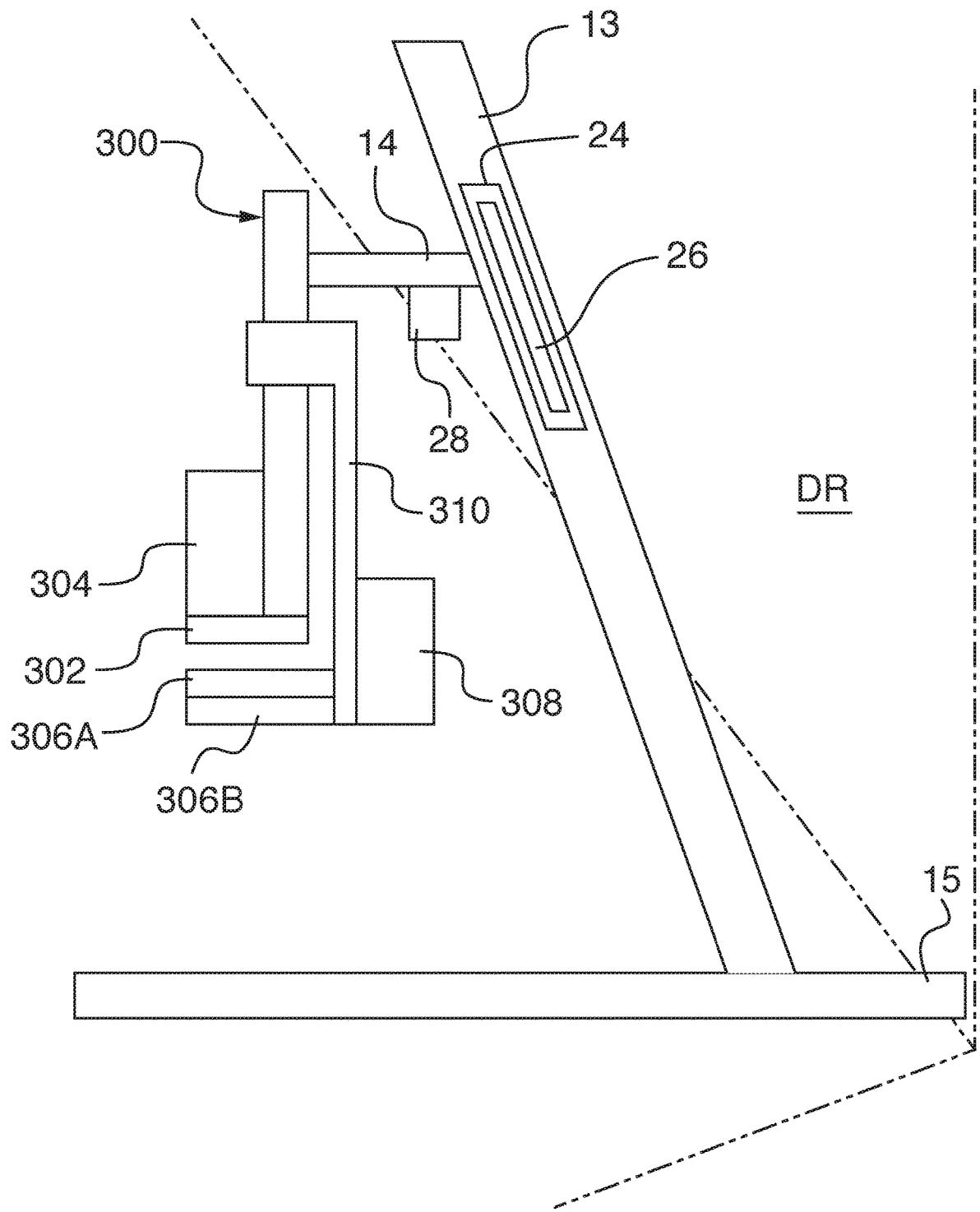
FIG. 15 is a side view of an alternative embodiment of the present invention showing a photographic enlarger in a dark room utilizing a laser projector module.

For the example that uses a laser projection module, the laser projector module comprises the requisite light sources, lenses, and filters, thereby forming a compact projection device. Thus in this example, the carriage 22 is replaced with a laser projector module mounted on the support arm 14 which also includes the ultrasonic sensor 28, as shown most clearly in FIG. 15. In addition, an aperture 302 is associated with the laser projector module and is controlled by a servo motor 304. Moreover, a pair polarizing filters 306A/306B are also provided to reduce light intensity and are controlled by a polarizer servo 308. The polarizing filters 306A/306B and the polarizer servo 308 are positioned on a mounting bracket 310 that secures to the laser projector module 300.

The example that uses the digital light processing module is similar to the example that uses the laser projection module. Specifically, in that example, the digital light processing module includes the light sources, lenses, and filters, and thus forms a compact projection device. Thus, again, in this example, instead of the carriage 22 is a digital light processing module mounted on the support arm 14, which also includes the ultrasonic sensor 28. The aperture 302 is controlled by the servo motor 304. As with the laser projection module example, with the digital light processing module, a pair of polarizing filters 306A/306B, positioned on the mounting bracket 310, and controlled by the polarizer servo 308, are provided to reduce light intensity.

It should be understood that in the present disclosure, any mentioned instance of the LCD module 20A may be replaced with any of the alternatives described herein such as the laser projection module or the digital light processing module.

Figure 16:
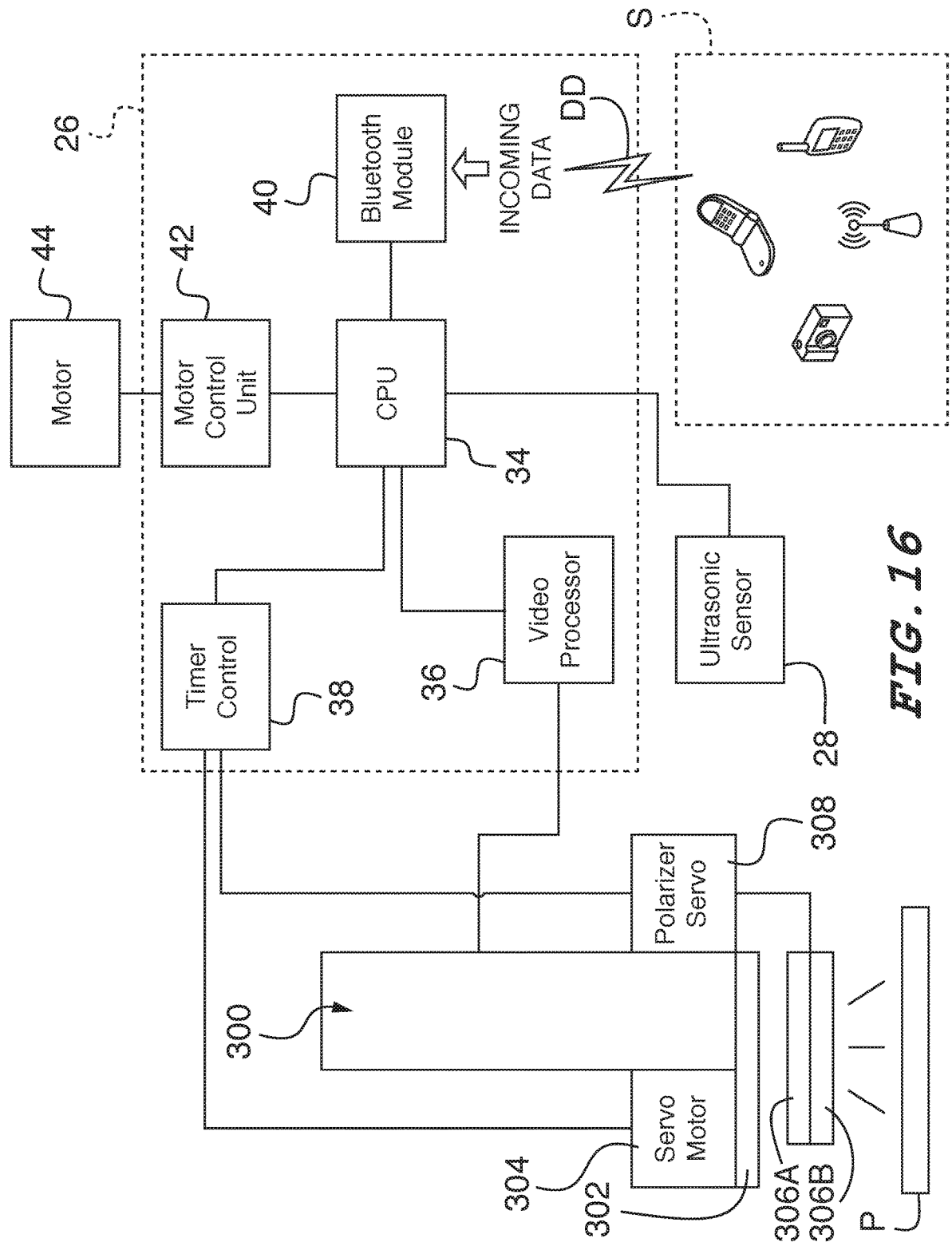
FIG. 16 is a block diagram of the photographic enlarger of the invention of FIG. 15 receiving digital photograph data from a variety of sources for print enlargement.

FIG. 16 provides a block diagram of the enlargement system utilizing the alternative projector module 300. This block diagram is similar to the block diagram of FIG. 3 but wherein the carriage 22 has been replaced with the alternative projector module 300, aperture 302, the servo motor 304, and the mounting bracket 310 containing the polarizer filters 306A/306B and the polarizer servo 308. In particular, the aperture 304 is coupled to the emission end of the alternative projector module 300 to cover incoming light from striking the photosensitive printing paper P. The servo motor 304 drives the aperture 302 back and forth (e.g., reciprocate) to create this effect. The servo motor 302 is commanded by the CPU 34 via the timer module 38. Furthermore, the external polarizing filters 306A/306B are adjusted by the polarizer servo 308 (also commanded by the CPU 34 via the timer module 38) to reduce light intensity. Other than that, the enlargement system of FIG. 16 operates in a similar fashion to the system shown in FIG. 3.

Figure 17:
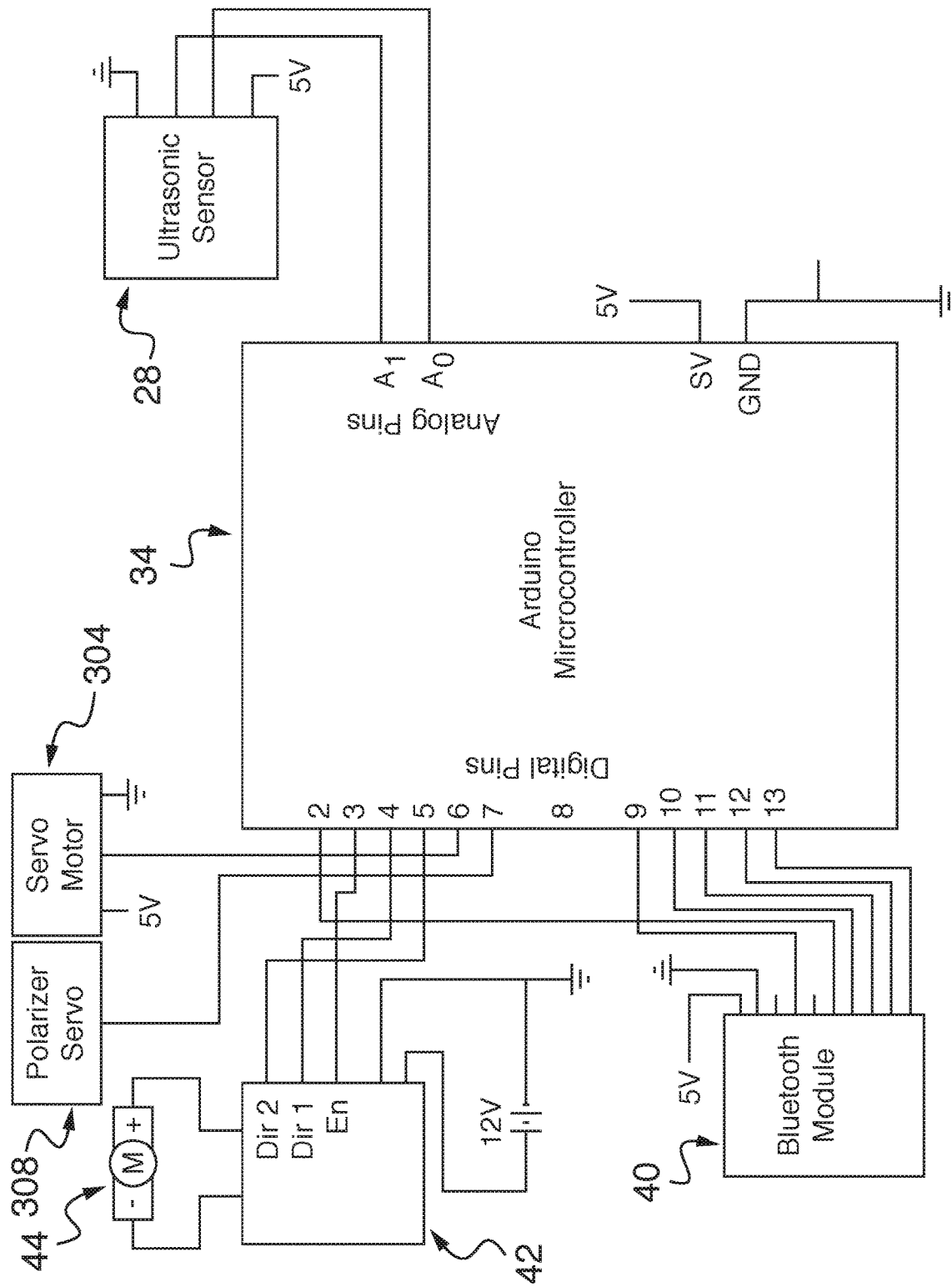
FIG. 17 is an exemplary electrical schematic of the photograph enlarger in a dark room utilizing the laser projector module of FIG. 15.

FIG. 17 provides an electrical schematic for the block diagram of FIG. 16 using the alternative projector module 300. Again, other than the servo motor 304 and the polarizer servo 308 coupled to the CPU 34, the system operates similarly to the system shown in FIG. 5. Rather than use the relay circuit R as shown in FIG. 3, the servo motor 304 operation achieves the same result.

Figure 18:
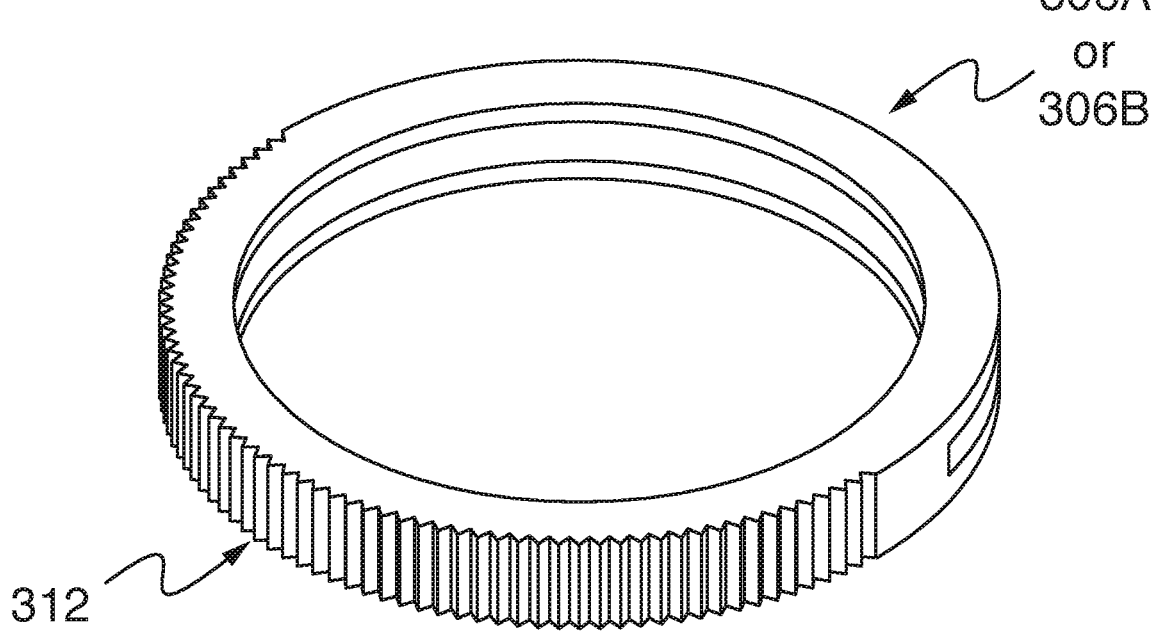
FIG. 18 is an isometric view of a single polarizing filter used with laser projector module.
Figure 19:
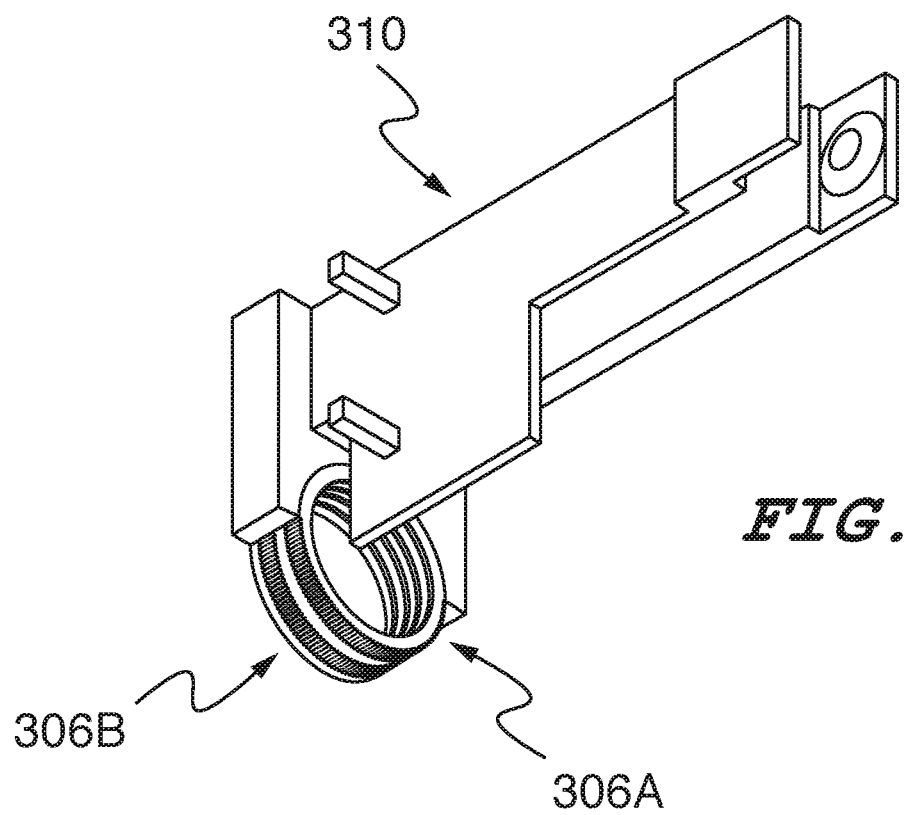
FIG. 19 is an isometric view of an exemplary mounting bracket comprising the pair of polarizing filters used with the laser projector module.

FIG. 18 depicts one of the polarizing filters 306A or 306B each of which contains a polarized sheet (e.g., polarizing film sheet, model 93493 Gadget & Electronics Store, etc.). The filters comprise circular housings that have a one-half gear configuration 312, thereby allowing an intermediate gear (not shown) for one polarizing filter 306A or 306B to displace both housings in opposite directions to shorten the distance traveled in each spin; as such, the polarizing servo need only spin 180°. FIG. 19 depicts how the pair of polarizing filters 306A/306B are arranged in the mounting bracket 310 such they are displaced slightly away from the output end of the laser projector module 300 adjacent the aperture 302. By controlling the polarizing filters 306A/306B, e.g., by decreasing the amount of light intensity, this permits a laser printer (not shown) to obtain increased exposure times per print without over-exposing the image. It should be understood that although polarizing filters 306A/306B are described, either or both of elements 306A and 306B may be removed or may be substituted for other elements such as a polycarbonate filter or other types of filters.

The process for developing an image using the LCD module 20A and the alternative projector module 300 are very similar. The differences reside in the fact that the LCD module 20A requires relatively longer exposure times than the alternative projector module 300. Because the LCD module 20A exhibits these longer exposure times, this permits the operator to make edits in more traditional ways whereas with the alternative projector module 300, these similar types of edits would have to be made earlier in the process on a computer and then the alternative projector module 300 would run the print protocol. Furthermore, because the LCD module 20A is also a digital component, it could also run the same print protocol but with just longer exposure times. With particular regard to the flow diagram of FIG. 6 (excluding the first step 102), the difference between the enlarger operation with the LCD module 20A and with the laser projector module 300, resides in between steps 118 and 120. Currently artists make edits to the paper P while it is being exposed, known as BD. However, due to the short exposure time in the laser projector module 300, as mentioned above, these edits would be conducted earlier in the process on a computer. In contrast, with the LCD module 20A in place, the editing process could be conducted on both the computer and live during exposure.

While the invention has been described in detail and with reference to specific examples thereof, it will be apparent to one skilled in the art that various changes and modifications can be made therein without departing from the spirit and scope thereof.

What is claimed is:

1. A photograph enlarger for enlarging digital photographs onto a photosensitive material, the photograph enlarger comprising:
   an enlarger stand from which an enlarger chassis projects; and
   a carriage comprising a light source, a condenser, a focal lens, and a removable projector module,
   wherein the carriage is connected to a support that is displaceable along the enlarger chassis for allowing the carriage to be positioned at a desired height above the enlarger stand to effect a desired enlargement size when a digital photograph is projected using the projector module and the light source is energized to form an enlarged photographic image for exposing a photosensitive material positioned on the enlarger stand under the focal lens.

2. The photograph enlarger of claim 1 wherein the removable projector module includes one of a removable liquid crystal display ("LCD") projector, a laser projector, and a digital light processing module.

3. The photograph enlarger of claim 1 wherein an enlarger mount is positioned on the enlarger chassis and the enlarger mount includes a motor and gearing for displacing the carriage.

4. The photograph enlarger of claim 3, wherein the enlarger mount includes electronics configured to control the light source, the projector module, and displacement of the carriage.

5. The photograph enlarger of claim 1, further comprising a non-contact sensor coupled to the electronics, the non-contact sensor being configured to detect a height of the carriage above the enlarger stand.

6. The photograph enlarger of claim 5 wherein the non-contact sensor comprises an ultrasonic sensor.

7. The photograph enlarger of claim 1 wherein electronics of the enlarger comprises a wireless interface module configured to receive digital photograph data from a wireless device.

8. The photograph enlarger of claim 1 wherein the wireless device comprises a software application configured to wirelessly receive commands from an operator, and process the commands to configure and control the enlarger.

9. The photograph enlarger of claim 8 wherein the software application is further configured to perform operations for controlling the manner in which the photo-sensitive material is exposed.

10. A method for enlarging digital photographs onto photosensitive material, the method comprising:
receiving a digital photograph at a photograph enlarger, the photograph enlarger comprising an enlarger stand from which an enlarger chassis projects, and a carriage comprising a light source, a condenser, a focal lens, and a removable projector module, wherein the carriage is connected to a support that is displaceable along the enlarger chassis for allowing the carriage to be positioned at a desired height above the enlarger chassis;
illuminating a base of the enlarger with an image preview;
adjusting height of the enlarger chassis to adjust size of the image preview; and
exposing a photosensitive material through the removable projector module.

11. The method of claim 10, further comprising switching off the image preview prior to exposing the photosensitive material through the removable projector module.

12. The method of claim 10, wherein the removable projector module includes one of a removable liquid crystal display ("LCD") projector, a laser projector, and a digital light processing module.

13. The method of claim 10, wherein the photograph enlarger further comprises an enlarger mount that includes electronics configured to control the light source, the projector module, and displacement of the carriage.

14. The method of claim 10, wherein adjusting height of the enlarger chassis comprises detecting, via a non-contact sensor coupled to the electronics, a height of the carriage above the enlarger stand.

15. The method of claim 10, wherein receiving the digital photograph data is performed via a wireless interface of electronics of the enlarger.

16. A photograph enlarging system, comprising:
a photograph enlarger; and
a computing device configured to execute a software application configured to control the enlarger to generate an image on a photosensitive material, by:
transmitting a digital photograph to a photograph enlarger, the photograph enlarger comprising an enlarger stand from which an enlarger chassis projects, and a carriage comprising a light source, a condenser, a focal lens, and a removable projector module, wherein the carriage is connected to a support that is displaceable along the enlarger chassis for allowing the carriage to be positioned at a desired height above the enlarger chassis;
instructing the enlarger to illuminate a base of the enlarger with an image preview;
instructing the enlarger to adjust height of the enlarger chassis to adjust size of the image preview; and
instructing the enlarger to expose a photosensitive material through the removable projector module.

17. The photograph enlarging system of claim 16, wherein the computing device is further configured to instruct the enlarger to switch off the image preview prior to exposing the photosensitive material through the removable projector module.

18. The photograph enlarging system of claim 16, wherein the removable projector module includes one of a removable liquid crystal display ("LCD") projector, a laser projector, and a digital light processing module.

19. The photograph enlarging system of claim 16, wherein the photograph enlarger further comprises an enlarger mount that includes electronics configured to control the light source, the projector module, and displacement of the carriage.

20. The photograph enlarging system of claim 16, further comprising a non-contact sensor coupled to the electronics, the non-contact sensor being configured to detect a height of the carriage above the enlarger stand.

* * * * *